US006279101B1

(12) United States Patent
Witt et al.

(10) Patent No.: US 6,279,101 B1
(45) Date of Patent: Aug. 21, 2001

(54) INSTRUCTION DECODER/DISPATCH

(75) Inventors: David B. Witt; William M. Johnson, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 08/474,791

(22) Filed: Jun. 7, 1995

Related U.S. Application Data

(63) Continuation-in-part of application No. 07/929,770, filed on Aug. 12, 1992, now abandoned.

(51) Int. Cl.[7] .................................................. G06F 9/38
(52) U.S. Cl. ............................................. 712/215; 712/206
(58) Field of Search .................................... 712/205, 206, 712/214, 215

(56) References Cited

U.S. PATENT DOCUMENTS

| | | |
|---|---|---|
| 4,807,115 | 2/1989 | Torng . |
| 4,942,525 | 7/1990 | Shintani et al. . |
| 5,051,885 | 9/1991 | Yates, Jr. et al. . |
| 5,129,067 | 7/1992 | Johnson . |
| 5,136,697 | * 8/1992 | Johnson ............................... 712/237 |

FOREIGN PATENT DOCUMENTS

| | | |
|---|---|---|
| 4222275A | 7/1992 | (DE) . |
| 0363222 | 11/1990 | (EP) . |
| 0492968A2 | 1/1992 | (EP) . |

OTHER PUBLICATIONS

Acosta et al, "An Instruction Issuing Approach to Enhancing Performance in Multiple Functional Unit Processors" IEFE Transactors on Computers VC–35 No. 9, Sep. 1986.

Tomasulo, "An Efficient Algorithm for Exploiting Multiple Arithmetic Units " IBM Journal Jan. 1967 pp 25–33.

Keller, "Look–Ahead Processors" Computing Services vol. 7., No. 4, Dec. 1975 pp. 177–195.

Dwyer, Harry III "A Multiple, Out–Of–Order, Instruction Issuing System For Superscalar Processors", Aug. 1991, pp. 1–249

* cited by examiner

*Primary Examiner*—Richard L. Ellis
(74) *Attorney, Agent, or Firm*—Foley & Lardner

(57) ABSTRACT

A super-scalar microprocessor performs operations upon a plurality of instructions at each of its fetch, decode, execute, and write-back stages. To support such operations, the super-scalar microprocessor includes a dispatch arrangement including an instruction cache for fetching blocks of instructions including a plurality of instructions and an instruction decoder which decodes and dispatches the instructions to functional units for execution. The instruction decoder applies a dispatch criteria to selected instructions of each block of instructions and dispatches the selected instructions which satisfy the dispatch criteria. The dispatch criteria includes the requirement that the instructions be dispatched speculatively in order, that supporting operands be available for the execution of the instructions, or tagged values substituted that will be available later, and that the functional units required for executing the instructions be available. The operation of the instruction decoder and the instruction cache is coordinated by a preset protocol which assures that the instructions are dispatched in ascending consecutive order and that blocks of instructions are efficiently fetched for decode and dispatch by the instruction decoder.

87 Claims, 8 Drawing Sheets

| CYCLE | DEC PC | NX PC | FPC | IDISP | | | | IBUSES | | | | HOLDIFET |
|---|---|---|---|---|---|---|---|---|---|---|---|---|
| | | | | | | | | 0 | 1 | 2 | 3 | |
| 1 | A | — | B | | | | | A0 | A1 | A2 | A3 | 0 |
| 2 | A | B | B+4 | A0 | A1 | | | A2 | B1 | B2 | B3 | 0 |
| 3 | B | B+4 | B+8 | A2 | | | | B1 | B2 | B3 | B4 | 0 |
| 4 | B | B+8 | B+8 | B1 | B2 | | | B3 | B4 | B5 | B6 | 0 |
| 5 | B+4 | B+8 | E | B3 | B4 | B5 | | B6 | B7 | B8 | B9 | 0 |
| 6 | B+8 | E | E+4 | B6 | B7 | B8 | | B9 | E3 | | | 0 |
| 7 | E+4 | — | E+8 | B9 | E3 | | | E4 | E5 | E6 | E7 | 0 |

FIG. 8

INSTRUCTION DECODER/DISPATCH

RELATED APPLICATIONS

The present application is a continuation-in-part of U.S. Ser. No. 07/929,770, filed Aug. 12, 1992 entitled "Decoder/Dispatch Unit for a Superscalar, Multiple Issue Processor Providing Prefetch, Decode, Issue and Dispatch of Aligned Instructions within a Cache Block and Processor Utilizing Same" now abandoned, and related to U.S. Pat. No. 5,136,697 issued on Aug. 4, 1992 entitled "System for Reducing Delay for Execution Subsequent to Correctly Predicted Branch Instruction Using Fetch Information Stored with Each Block of Instructions in Cache".

BACKGROUND OF THE INVENTION

The present invention generally relates to a super-scaler microprocessor of the type which executes more than one instruction during each operating cycle of the microprocessor. The present invention more particularly relates to an instruction decoder for use in such a super-scalar microprocessor which is configured for decoding and dispatching a plurality of instructions to functional units for execution during each microprocessor operating cycle.

Scalar microprocessors are well known in the art. Such processors generally employ a pipelined architecture for obtaining and executing instructions in sequential stages including a fetch stage, a decode stage, an execute stage, and a write-back stage. When such a microprocessor continuously executes on instructions in consecutive operating cycles, during the fetch stage, a first instruction is fetched from a source of instructions, such as, for example, either an internal instruction cache or an external instruction memory. During the decode stage of the first instruction, the first instruction is decoded for, as an example, required read operands and the type of execution required by the instruction. During the decode stage of the first instruction, a second instruction enters the fetch stage and is fetched. During the execution stage of the first instruction, the first instruction is executed by the required functional unit while the second instruction advances to its decode stage and a third instruction enters its fetch stage. Lastly, during the write-back stage of the first instruction, the functional unit which executed the first instruction writes-back to memory the result of the execution. During the write-back stage of the first instruction, the second instruction advances to its execution stage, the third instruction advances to its decode stage, and a fourth instruction enters its fetch stage. As can thus be seen from the foregoing, a processor of this type can operate on as many as four instructions at a time and, given no traps or exception conditions, can execute at a rate up to one instruction execution per microprocessor operating cycle. Also, by virtue of the pipelined architecture, such processors are capable of performing a great number of complex operations per unit of time with a minimum of hardware.

Although such scalar processors have been commercially successful and proven reliable and capable of performance speeds suitable for many different applications, the concept of utilizing such a pipelined architecture in a processor for executing more than one instruction during each operating cycle has recently been introduced. In order to support the execution of a plurality of instructions during each operating cycle, such processors, known in the art as super-scalar processors, must be capable of fetching and decoding and dispatching to the functional units a plurality of instructions during each operating cycle. These functions must be carefully coordinated.

For example, program instruction order must be maintained to assure that instructions are dispatched to the functional units in the predicted order of execution. Dispatching instructions that are not in the predicted execution path would result in execution of instructions not intended to be executed. Also, if required operands are stored in a register file or a buffer, it must be assured that such operands are available for the required functional unit and that the required functional unit itself is available before the corresponding instruction is dispatched. Further, if one or more instructions of a previously fetched plurality of instructions cannot be dispatched, it is necessary to once again provide those instructions for decoding. This requires coordination between the instruction decoder and the source of instructions, such as, for example, an instruction cache. Still further, nonsequential branch instructions must also be accommodated. All of the foregoing places upon a super-scalar microprocessor extreme coordination requirements for the simultaneous fetching, decoding and dispatching, execution and write-back of multiple instructions at each stage.

The microprocessor of the present invention provides such coordination. It includes an instruction decoder embodying the present invention which maintains account of the availability of required operands, the availability of functional units, and the program instruction order. In addition, the interface between the instruction decoder and the instruction cache is elegant in its simplicity and operates in accordance with the same predefined protocol whether a plurality of instructions are newly presented to the instruction decoder, whether a previous plurality of instructions are once again presented to the instruction decoder, or whether a plurality of instructions presented to the instruction decoder contain a nonsequential branch instruction.

SUMMARY OF THE INVENTION

The present invention provides an instruction decoder for use in a processor of the type including a source of instructions and a plurality of functional units for executing the instructions, wherein the instruction decoder includes input means coupled to the source of instructions for receiving a block of instructions from the source of instructions. The block of instructions contains a plurality of the instructions. The instruction decoder further includes decoding means for decoding selected ones of the instructions of the received block of instructions. The decoding means also includes dispatch control means for applying a dispatch criteria to the selected ones of the instructions of the received block of instructions. The instruction decoder further includes output means coupled to the functional units and responsive to the dispatch control means for dispatching all of the selected instructions of the received block of instructions satisfying the dispatch criteria in parallel to the functional units.

The present invention further provides an instruction dispatch arrangement for use in a microprocessor of the type including multiple functional units and configured for executing a plurality of instructions during each microprocessor operating cycle. The instruction dispatch arrangement includes an instruction source for providing a block of instructions during each operating cycle wherein each block of instructions includes a plurality of instructions and wherein the instruction source also provides a predicted executed bit with selected ones of the instructions of the block of instructions. The arrangement further includes instruction decoder means coupled to the instruction source for applying a dispatch criteria to the selected instructions of the block of instructions and dispatching to the functional units for execution all the selected instructions satisfying the dispatch criteria.

The present invention still further provides a microprocessor arranged to execute at least one instruction during each cycle of consecutive operating cycles. The microprocessor includes instruction source means for providing a block of instructions during a present one of the operating cycles wherein the block of instructions includes a plurality of the instructions and wherein the instruction source means provides with each instruction a predicted executed bit which is set for selected ones of the instructions. The microprocessor further includes instruction decoder means coupled to the instruction source means for decoding and applying a dispatch criteria to the selected ones of the plurality of the instructions of the block of instructions during the present operating cycle and for dispatching during the next operating cycle immediately following the present operating cycle all the selected instructions satisfying the dispatch criteria and a plurality of functional units coupled to the instruction decoder means for receiving the dispatched instructions during the next operating cycle immediately following the present operating cycle for executing the dispatched instructions.

The invention still further provides an instruction dispatch arrangement for use in a microprocessor of the type including multiple functional units and configured for executing a plurality of instructions during each microprocessor operating cycle. The instruction dispatch arrangement includes an instruction source for providing a plurality of instructions during each operating cycle and instruction decoder means coupled to the instruction source for applying a dispatch criteria to the plurality of instructions and dispatching to the functional units all of the instructions satisfying the dispatch criteria.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

FIG. 8 is a chart which diagrammatically illustrates the operation of the instruction dispatch arrangement in accordance with the second preferred embodiment of the present invention.

DETAILED DESCRIPTION

Figure 1:
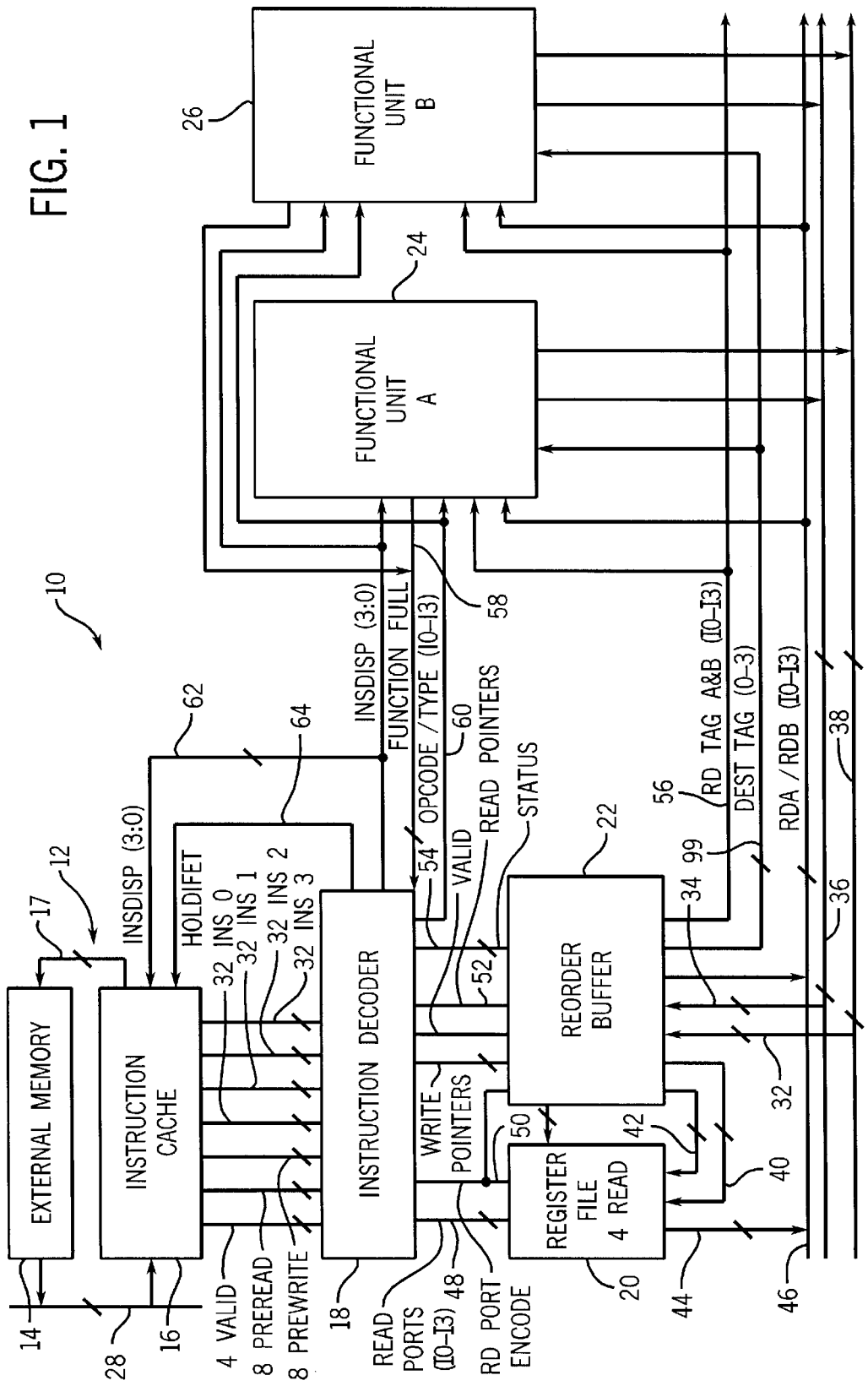
FIG. 1 is a block diagram of a super-scalar microprocessor embodying the present invention.

Referring now to FIG. 1, the super-scalar microprocessor 10 thereshown generally includes a source of instructions 12 including an external memory 14 and an instruction cache 16, an instruction decoder 18, a register file 20, a reorder buffer 22, and functional units 24 and 26. Although two such functional units are illustrated in FIG. 1, it will be appreciated by those skilled in the art, that more than two such functional units may be utilized in practicing the present invention. Each functional unit is dedicated for performing a certain type of operation. For example, a functional unit may be configured to effect branch operations, load/store operations, or shift operations or may be configured as an arithmetic logic unit, a floating point adding unit, a floating point multiplication unit, or a floating point division unit, for example.

The super-scalar microprocessor 10 is configured for performing operations upon a plurality of instructions at each of the fetch, decode, execute, and write-back stages. Further, in accordance with the present invention, the super-scalar microprocessor 10 is configured for operating upon up to four instructions in the fetch stage, up to four instructions in the decode stage, up to a number of instructions equal to the number of functional units in the execute stage and up to three instructions driven on a result bus to a reorder buffer plus up to four instructions written back to register file during the write-back stage. To support such executions, the instruction decoder 18 is provided with a block of instructions during each microprocessor operating cycle wherein, in accordance with the present invention, each block of instructions contains four instructions.

The four instructions of each block of instructions provided to the instruction decoder 18 are arranged in consecutive ascending order so that in each block of instructions there is an instruction 0, an instruction 1, an instruction 2, and an instruction 3. The block of instructions presented to the instruction decoder 18 during each microprocessor operating cycle are provided by the instruction cache 16. The block of instructions is either provided directly from the instruction cache 16 or from the external memory 14 through the instruction cache 16. To that end, the external memory 14 is coupled to the instruction cache 16 by a multiple-bit bus 28. If the block of instructions to be presented to the instruction decoder 18 does not reside in the instruction cache 16, as will be seen hereinafter, an instruction fetch program count is conveyed to the external memory 14 over a bus 17 for addressing and fetching the required block of instructions. The externally fetched block of instructions is then passed from the external memory 14, onto the bus 28, and to the instruction cache 16. The instruction cache 16 will, in most cases, be able to provide the required block of instructions since the instruction cache stores those instructions that have been recently used and which are likely to be used again. Hence, the instruction cache 16 provides the advantage of locality of reference that is common to such caches.

Each of the four instructions of each block of instructions provided to the instruction decoder 18 by the instruction cache 16 includes a multiple-bit instruction word containing, for example, 32 bits. The instruction cache 16, with each instruction word of each instruction, also provides four predecoded instruction bits and one valid or predicted executed bit. The four predecoded instruction bits contain predecoded instruction information with two of the four predecoded bits being preread bits indicating the number of read operands required for executing the corresponding instruction and the other two predecoded bits being prewrite bits indicating the number of write operands required for executing the corresponding instruction. The valid or predicted executed bit is utilized by the instruction decoder 18 to determine if the corresponding instruction is to be decoded and dispatched. If the predicted executed bit is set (logical 1) this indicates that the corresponding instruction is to be decoded and dispatched. However, if the predicted executed bit is reset (logical 0) this indicates that the corresponding instruction is not to be decoded and dispatched. Hence, as indicated in FIG. 1, during each microprocessor operating cycle, the instruction cache 16 provides the instruction decoder 18 with four 32-bit instruction words, 8 predecoded preread bits, 8 predecoded prewrite bits, and 4 valid or predicted executed bits.

The register file 20 comprises a random access memory for storing operand data required for the execution of instructions and for storing results resulting from the execution of executed and retired instructions. Since each block of instructions contains four instructions with each instruction potentially requiring up to two operands, to fully support the execution of each block of instructions, the register file 20 would require eight read ports. However, and in accordance with the present invention, the register file 20 includes a fewer number of read ports than potentially required for the execution of all of the instructions of a block of instructions to be decoded and dispatched by the instruction decoder 18. More specifically, and in accordance with the present invention, the register file 20 includes four read ports.

The reorder buffer 22 is a temporary buffer having a plurality of entries for storing forwarded data to be used for modifying the data stored in the storage registers of register file 20 or intermediate data resulting from the execution of previous instructions which are to be utilized as operand data for following instructions. Each data entry within the reorder buffer 22 is provided with a tag by the reorder buffer indicative of program order so that when forwarded operand data is provided by the reorder buffer 22, such data is provided in proper program order. The reorder buffer 22 includes a pair of ports 32 and 34 which are coupled to result buses 36 and 38 for receiving results from the functional units. When a result received by the reorder buffer 22 corresponds to the execution of a corresponding instruction to be retired, the reorder buffer 22 conveys the result to the register file 22 over one of buses 40 or 42 during a later operating cycle.

When the instruction decoder 18 decodes a block of instructions, it allocates the read ports 44 of the register file 20 to enable required operands for the instructions to be placed onto proper ones of operand buses 46 when the corresponding instructions are dispatched to the functional units. The instruction decoder 18 allocates the read ports for the instructions of the current block of instructions starting with the first instruction having a corresponding predicted executed bit set. To allocate the read ports 44 of the register file 20, the instruction decoder 18 generates read pointers for the required operands. The instruction decoder 18 utilizes the read pointers for generating the appropriate storage register addresses of the register file 20 and conveys the storage register addresses to the register file 20 over a plurality of buses 48. One such bus is provided for each corresponding read port as indicated in the figure. Along with the register file addresses, the instruction decoder 18 provides encoded read port control signals over a bus 50 for coupling the respective read ports to the proper ones of the instruction operand buses 46. For example, if instruction 0 of the current block requires an operand from the register file 20 and has its predicted executed bit set, the instruction decoder 18 provides the address of the register file storage register containing the required operand over the bus 48 and will also generate a control signal on bus 50 to cause the operand stored at that storage register to be placed upon the instruction operand bus corresponding to instruction 0.

The instruction decoder continues to allocate the read ports of the register file for each instruction in the ascending consecutive order. For example, if instruction 0 requires just one read port, the instruction decoder 18 then determines if the predicted executed bit is set for instruction 1. If it is, the instruction decoder 18 then determines if instruction 1 requires a register file read port. If it does require a register file read port, the instruction decoder will then allocate the required number of read ports for instruction 1 as described above.

After allocating the required read ports for instruction 1, the instruction decoder 18 then determines if the predicted executed bit corresponding to instruction 2 is set. If the predicted executed bit of instruction 2 is set, the instruction decoder then determines if instruction 2 requires read ports. If instruction 2 does require a read port, the instruction register 18 will allocate the required read ports of the register file 20 for instruction 2. If instruction 2 requires two read ports and if there is only one read port available for instruction 2, the instruction decoder 18 will not dispatch instruction 2 but will dispatch instructions 0 and 1 if other dispatch criteria are met.

The instruction decoder 18 dispatches the instructions of a block of instructions in consecutive order until one of the instructions cannot be dispatched. Accordingly, in the example above, since instruction 2 cannot be dispatched, the instruction decoder 18 will also not dispatch instruction 3. Since instruction 3 cannot be dispatched, the instruction decoder 18 will not determine if the predicted executed bit corresponding to instruction 3 is set and will not determine at this time if any read ports are required for instruction 3.

Operands for the execution of instructions may also be provided by the reorder buffer 22. As previously mentioned, the reorder buffer 22 contains a plurality of entries for storing intermediate results generated by the execution of previous instructions which intermediate results will be utilized by future instructions as operands. The reorder buffer 22 places a tag with each of its entries which reflect program order. The aforementioned read pointers generated by the instruction decoder 18 are conveyed to the reorder buffer over a plurality of buses 52 with each of the buses 52 corresponding to a respective one of the instructions. The reorder buffer 22 is also provided with the predicted executed bits of the four instructions of the current block of instructions by the instruction decoder 18. When the reorder buffer 22 receives a read pointer along with a corresponding predicted executed bit set for an instruction, it will determine if it contains the required operand. If it does contain the required operand, it will communicate this condition to the instruction decoder over one of a plurality of status buses 54. If the reorder buffer contains the required operand data, the instruction decoder 18 will then be advised that it need not allocate a register file read port for that operand. As a result, since the reorder buffer 22 is capable of providing forwarded operands, a fewer number of register file read ports are required than the total number of potential read ports that would be required by the four instructions of each block of instructions.

When the reorder buffer 22 provides forwarded operand values, it also receives the read port encode control signals from the instruction decoder 18 to disable the corresponding read of that port from the register file. This enables the reorder buffer to place the required forwarded operands onto the proper instruction operand buses 46.

To further increase the capacity of providing operands for instruction execution, if the reorder buffer 22 does not contain the required forwarded operand but has already provided a tag value for the forwarded operand, this indicates that the forwarded operand has not yet been generated by the execution of the corresponding previous instruction. However, the reorder buffer 22, instead of providing the required forwarded operand, will provide to the appropriate instruction operand bus a tag value on the proper operand bus. When the corresponding instruction is dispatched to the functional units, the functional unit to execute the instruction will receive the tag value and adjust its hardware in a manner to be described hereinafter for receiving the forwarded operand directly from the functional unit generating the forwarded operand. The functional unit requiring the directly forwarded operand will receive the operand off of one of the result buses 36 or 38 when it matches the tag value provided by the reorder buffer 22 to the tag value accompanying the forwarded operand from the functional unit generating the forwarded operand. This is made possible since the reorder buffer 22, when an instruction is dispatched, provides a destination tag over one of a plurality of destination tag buses 99. Each destination tag bus corresponds to a respective given one of the instructions.

For example, when an instruction is dispatched to the functional units, the reorder buffer 22 provides a destination tag over the corresponding one of the buses 99. The tag is received by the functional unit which is to execute the instruction. When the functional unit executes the instruction, it places the result onto one of the result buses 36 or 38 along with the destination tag provided by the reorder buffer 22. In this manner, when the reorder buffer 22 receives the result at one of its inputs 32 or 34, it will store the result along with the tag value. If that result is required for a future instruction, when the reorder buffer 22 provides that result upon the dispatch of the instruction requiring the result, the reorder buffer 22 will provide along with the forwarded operand, a "forwarded" tag value over one of the operand tag buses 56 which will then be utilized by the functional unit when forwarding the result of that execution to the functional unit for execution.

As can be seen from the foregoing, the reorder buffer 22, when providing forwarded operand values, communicates this condition to the instruction decoder 18 so that the instruction decoder 18 need not allocate a register file read port for that operand. Hence, when scanning the instructions in consecutive order for allocating register file read ports, the instruction decoder 18 will conditionally dispatch all instructions of the current block of instructions in consecutive order for which required operand data can be provided. When one such instruction cannot be provided with operand data from either the register file 20 or the reorder buffer 22, the instruction decoder 18 then ceases dispatching instructions with the first such instruction which cannot be provided with operand data. For example, if instructions 0 and 1 can be provided with operand data but instruction 2 cannot be provided with operand data either from the register file 20 or the reorder buffer 22, the instruction decoder will not dispatch instructions 2 and 3 but will consider instructions 0 and 1 to be conditionally dispatched.

The instruction decoder 18 determines whether instructions are conditionally dispatched because the dispatch criteria utilized by the instruction decoder 18 further requires that a functional unit required for the execution of an instruction be available. As will be seen hereinafter, each of the functional units has a capacity for queuing a finite number of instructions. If a required functional unit is full, it will provide a function full signal over one of a plurality of function full buses 58. If the instruction decoder 18 determines that a required functional unit is full responsive to the functional full signal received from that functional unit, the instruction decoder 18 will not dispatch the instruction which requires the functional unit which is not available. Since the instruction decoder 18 dispatches the instructions in consecutive order, if, for example, the functional unit required for executing instruction 2 is not available, the instruction decoder will not dispatch instructions 2 and 3 even though operand data and a required functional unit may be available for instruction 3. Hence, the instruction decoder 18 first determines for each instruction in consecutive order if required operand data can be provided with each instruction. It considers as conditionally dispatched all instructions which can be provided with operand data but then scans the function full signals from the functional units to determine whether the required functional units are available. If one of the functional units required by one of the instructions is not available, the instruction decoder will not dispatch that corresponding instructions and all instructions of the current block of instructions following that instruction.

Referring more particularly to the functional units 24 and 26 of FIG. 1, it will be noted that each of the functional units 24 and 26 is coupled to the instruction operand buses 46, the operand tag bus 56, and the destination tag buses 99. In addition, each of the functional units is coupled to the instruction decoder 18 for receiving over a plurality of opcode/type buses 60, decoded opcode signals and type signals. As previously mentioned, the functional units may be of various different types. The instruction decoder 18, in decoding each instruction, provides a type signal corresponding to the functional unit required for executing each instruction and conveys the type signal to the functional units. Along with the type signals, the instruction decoder 18 also provides the opcodes for those functional units which may perform more than one function so that the required functional unit will be advised as to which function it is to perform upon the operand data.

Each of the opcode/type buses 60 corresponds to a respective given one of the instructions. When a functional unit sees a type signal corresponding to its type, it will know which one of the four instructions of the current block of instructions in decode it is to execute and which function it is to perform upon the operand data. Also, since the functional unit knows which instruction it is to execute, it will align its hardware with the respective destination tag bus and operand data bus for receiving the operand data and the destination tag.

The instruction cache 16 and instruction decoder 18, for dispatching instructions, form an instruction dispatch arrangement. The instruction decoder 18 and instruction cache 16 are coordinated by a protocol which will now be described. As previously mentioned, the instruction cache 16 provides with each instruction of the current block of four instructions a predicted executed bit which, if set, indicates to the instruction decoder 18 that it is to decode the corresponding instruction and dispatch the corresponding instruction if dispatch is possible. The instruction decoder 18 in turn provides the instruction cache 16 with instruction dispatch status control signals (INSDISP) over a 4-bit bus 62 with each bit of bus 62 corresponding to a respective given one of the instructions. For example, bit 0 of bus 62 corresponds to the instruction dispatch bit for instruction 0, bit 1 of bus 62 corresponds to the instruction dispatch bit of instruction 1, bit 2 of bus 62 corresponds to the instruction dispatch bit of instruction 2, and bit 3 of bus 62 corresponds to the instruction dispatch bit of instruction 3. If an instruction dispatch status bit is set, this indicates to the instruction cache 16 that the corresponding instruction has been dispatched. Conversely, if the instruction dispatch status bit for an instruction is reset, this indicates to the instruction cache 16 that the corresponding instruction has not been dispatched or that there was not a predicted instruction to dispatch depending on the previous state of the corresponding valid bit.

In addition to the instruction dispatch status bits generated by the instruction decoder 18, the instruction decoder 18 also generates a hold instruction fetch control signal (HOLDIFET) which is conveyed to the instruction cache 16 over line 64. If the hold instruction fetch bit is set, this indicates to the instruction cache 16 that it should not fetch the next block of instructions but instead, refresh and represent the current block of instructions to the instruction decoder 18 for further decoding and possible dispatch. If the hold instruction fetch signal is reset, this indicates to the instruction cache 16 that it should fetch the next block of instructions and present the next block of instructions to the instruction decoder 18 during the next operating cycle for decoding and possible dispatching.

The foregoing predicted executed, instruction dispatch status, and hold instruction fetch control signals are utilized in the following manner for coordinating the instruction cache 16 with the instruction decoder 18. Let us first assume that at the beginning of operating cycle 1 the instruction cache 16 presents a new block of four instructions to the instruction decoder 18 with each predicted executed bit of each of the instructions being set. The instruction decoder 18, during operating cycle 1, scans each of the instructions in consecutive order to determine which of the instructions can be dispatched. Assuming that instructions 0 and 1 can be dispatched but instruction 2 cannot be dispatched for whatever reason, at the end of cycle 1 and before cycle 2 the instruction decoder 18 sets the hold instruction fetch bit to indicate to the instruction cache 16 that it should represent the current block of instructions at the beginning of cycle 2. Hence, the instruction cache 16 will not fetch the next block of instructions but instead refresh the current block of instructions at the beginning of cycle 2.

At the beginning of cycle 2, the instruction decoder 18 sets the instruction dispatch status bits for instructions 0 and 1 but resets the instruction dispatch status bits for instructions 2 and 3. In response to the instruction dispatch status signals, the instruction cache 16 when refreshing the current block of instructions, resets the predicted executed bits of instructions 0 and 1 but maintains the set condition of the predicted executed bits for instructions 2 and 3. Hence, at the beginning of cycle 2, the instruction decoder 18 dispatches instructions 0 and 1 in parallel to the functional units while the instruction cache 16 represents all of the instructions of the current block of instructions to the instruction decoder 18 but with the predicted executed bits of instructions 0 and 1 reset and the predicted executed bits of instructions 2 and 3 set.

During cycle 2, the instruction decoder scans the refreshed block of instructions but will bypass instructions 0 and 1 because the predicted executed bits of these instructions have been reset by the instruction cache 16. As a result, the instruction decoder 18 begins its scanning of the instructions with the first instruction having a predicted executed bit set which, in this case, is instruction 2.

Let us now assume that the instruction decoder 18 can dispatch both instructions 2 and 3. Before the completion of cycle 2, the instruction decoder 18 resets the hold instruction fetch bit to indicate to the instruction cache 16 that at the beginning of cycle 3 it should present a new block of instructions to the instruction decoder 18 for decoding and dispatching. As a result, before the end of cycle 2, the instruction cache 16 fetches the next block of instructions. At the beginning of cycle 3, the instruction decoder dispatches instructions 2 and 3 of the refreshed block of instructions and sets the instruction dispatch status bits for instructions 2 and 3 but resets the instruction dispatch status bits for instructions 0 and 1 because these instructions are not dispatched at the beginning of cycle 3 since they were dispatched at the beginning of cycle 2. As a result, the instruction cache 16 can present the next block of instructions to the instruction decoder 18 at the beginning of cycle 3 because it had fetched the next block of instructions before the end of cycle 2.

As will also be noted in FIG. 1, the instruction dispatch status control signals are also conveyed from the instruction decoder 18 to the functional units. These signals are conveyed to the functional units so that the functional units will be advised as to which instructions are being dispatched. For example, if a functional unit sees its type signal for instruction 0 but will also see that the instruction dispatch status control signal for instruction 0 is not set, it will know that instruction is not yet being dispatched to it. If however the functional unit sees that the instruction dispatch status bit for instruction 0 is set, it will set an internal latch to latch the operand data in its queue for the eventual execution of the instruction.

As can thus be seen, each instruction passes through four microprocessor pipeline stages in parallel with up to three other instructions. During a fetch stage, the instruction cache 16 fetches a block of instructions. During a decode stage, the instruction cache 16 presents either a new block of instructions to the instruction decoder 18 or a refreshed block of instructions to instruction decoder 18. During the decoding stage, the instruction decoder 18 decodes selected instructions of the block of instructions. During the execute stage, one or more of the instructions are dispatched to the functional units and either executed by the functional units or placed in a queue for later execution. Lastly, during the write-back stage, the results from the execution of the instructions are conveyed from the functional units to the reorder buffer 22. If an instruction is to be retired, the final result is then conveyed at least one operating cycle after write-back to the register file 20.

As also will be noted in FIG. 1, the operation of the instruction decoder 18 and instruction cache 16 is coordinated by a protocol which utilizes the predicted executed, instruction dispatch status, and hold instruction fetch control bits. If the instruction decoder 18 cannot dispatch all instructions of a current block of instructions, it asserts the hold instruction fetch control signal before the beginning of the next operating cycle so that the instruction cache 16 can refresh the current block. In addition, the instruction decoder 18, at the beginning of the next operating cycle, utilizes the instruction dispatch status control signals to inform the instruction cache 16 which instructions of the current refreshed block of instructions it has already dispatched. In response to the instruction dispatch control signals, the instruction cache 16 resets the predicted executed bits for those instructions which have been dispatched so that the instruction decoder 18 will then bypass those instructions and begin decoding the refreshed block of instructions with the first such instruction having its predicted executed bit set. The instruction decoder 18 only dispatches instructions in consecutive order. As a result, and by virtue of the protocol between the instruction decoder 18 and instruction cache 16, it is assured that the instructions which are dispatched are dispatched in proper consecutive order.

Figure 2:
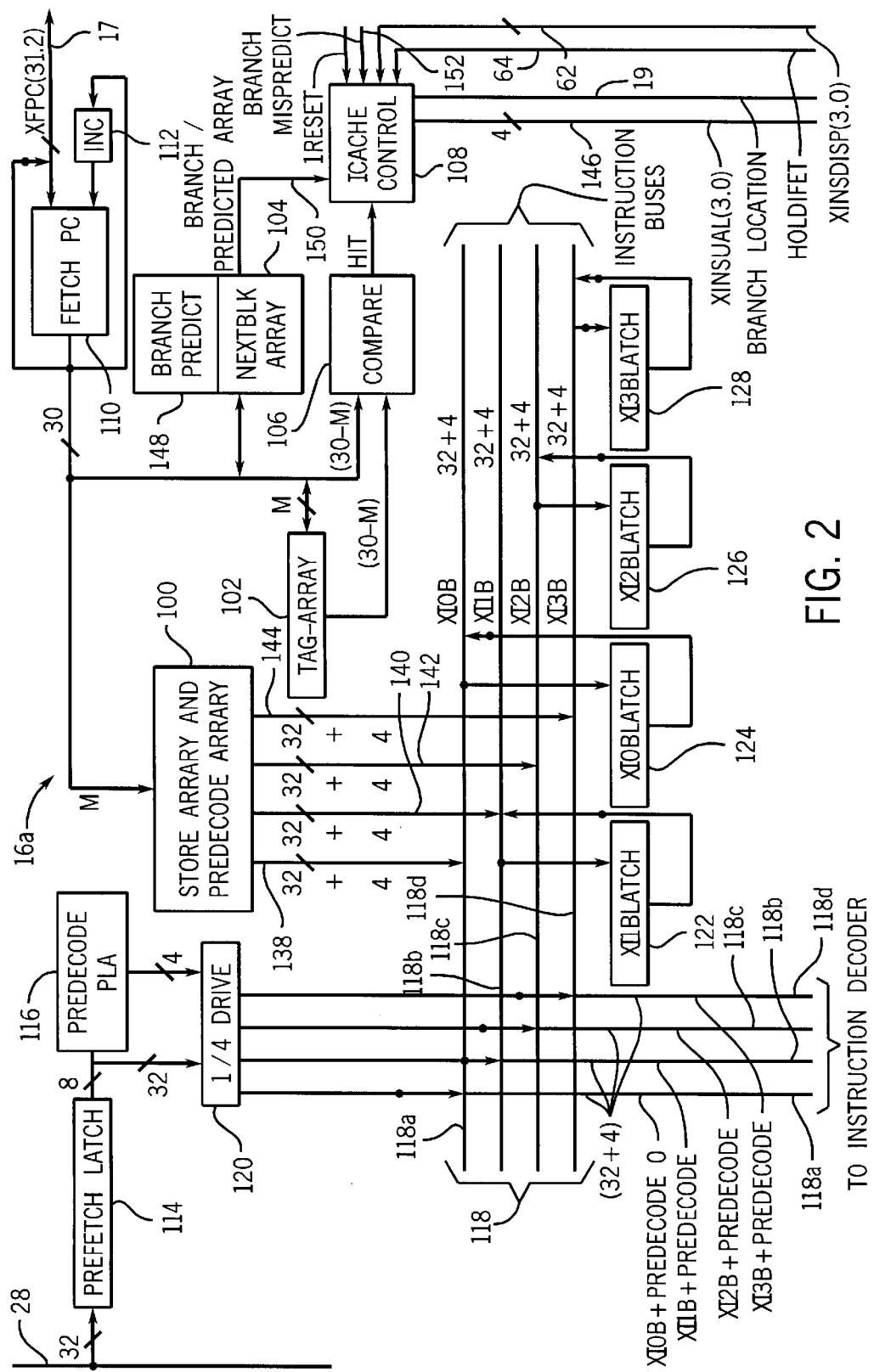
FIG. 2 is a detailed block diagram of the instruction cache of FIG. 1.

Referring now to FIG. 2, it illustrates in greater detail the instruction cache 16 of FIG. 1. The instruction cache 16 generally includes a store and predecode array 100, a tag array 102, a next block array 104, a compare 106, and an instruction cache control 108. The instruction cache 16 further includes a fetch program counter 110, an incrementer 112, a prefetch latch 114, and a predecode programmable logic array 116. The instruction cache 16 further includes a plurality of instruction buses 118, a 1 to 4 driver 120, and a plurality of instruction latches including latches 122, 124, 126, and 128.

The store and predecode array 100 is where the instruction word and the four predecode bits for each instruction are stored in the instruction cache. The plurality of instruction buses 118 includes one dedicated instruction bus for each instruction of the block of four instructions currently in decode. To that end, bus 118a is dedicated for instruction 0, bus 118b is dedicated for instruction 1, bus 118c is dedicated for instruction 2, and bus 118d is dedicated for instruction 3. Each of the aforementioned instruction buses is a 36 bit bus to accommodate the 32 bit instruction word of each instruction and the four predecode bits of each instruction.

When a block of instructions is provided directly from the instruction cache 16, each instruction of the block of four instructions is conveyed to its corresponding dedicated instruction bus 118a, 118b, 118c, and 118d over buses 138, 140, 142, and 144 respectively. When a block of instructions is to be refreshed and represented to the instruction decoder, each of the instructions of the current block of four instructions is latched in latches 122, 124, 126, and 128. Hence, instruction 0 is latched in latch 124, instruction 1 is latched in latch 122, instruction 2 is latched in latch 126, and instruction 3 is latched in latch 128. Each of the latches 122, 124, 126, and 128 is coupled to its respective dedicated instruction bus for refreshing its dedicated instruction bus with the corresponding instruction.

When a new block of instructions is to be fetched by the instruction cache 16, since each block of instructions contains four instructions, the fetch program counter 110 is first incremented by incrementer 112 by a count of four. The fetch program counter 110 provides a fetch program count address to the store and predecode array 100 to address the corresponding next block of four instructions. Also, each block of instructions includes a corresponding tag which is stored in the tag array 102. The compare 106 compares the tag stored in the tag array 102 to the current fetch program count and if they compare, the compare 106 determines that there is a hit in the cache for the next block of instructions and conveys a hit signal to the instruction cache control 108 to advise the instruction cache control 108 that the next block of instructions resides in the store and predecode array 100.

If there is not a hit in the cache 16 for a next block of instructions, the fetch program counter address is conveyed over bus 17 to the aforementioned external memory for fetching externally the next block of instructions. The externally fetched block of instructions is conveyed over bus 28 to the prefetch latch 114. The externally fetched instructions are serially conveyed to the 1 to 4 driver 120 along with the four predecode bits of each instruction which are obtained from the predecode programmable logic array 116. Each externally fetched instruction together with its four predecode bits is then driven by the 1 to 4 driver 120 onto the corresponding dedicated instruction buses 118a, 118b, 118c, and 118d for presentation to the instruction decoder.

When a block of instructions is driven onto buses 118a, 118b, 118c, and 118d, the instruction cache control 108 also provides the predicted executed bit for each corresponding instruction over the 4 bit bus 146. As previously mentioned, the predicted executed bits cause the instruction decoder to decode for possible dispatch only those instructions which has a corresponding predicted executed bit which is set.

The next block array 104 of the instruction cache 116 is provided for predicting the next block of instructions. Hence, it serves to keep track of the program order of the blocks of instructions. The next block array accomplishes this function by predicting when a block of instructions contains an instruction which is a branch instruction requiring a nonsequential fetch program counter address for the next block of instructions to be presented to the instruction decoder. To that end, the next block array 104 maintains, for each block of instructions, a branch bit which, if set, indicates that the current block of instructions contains a branch instruction. If the branch bit is not set, the next block array 104 predicts that all four instructions of the current block of instructions are sequential instructions and therefore that the current block of instructions does not contain a predicted token branch instruction.

The next block array 104 includes a branch predict section 148 which maintains the branch bit for each block of instructions. The branch predict 148 also includes, for those blocks of instructions which has a branch bit set, a pair of pointer bits which indicate which instruction of the current block of instructions is the predicted token branch instruction. For example, if instruction 1 of a current block of instructions is a branch instruction, the pointer bits will indicate that instruction 1 is a branch instruction. The predicted branch information is conveyed to the instruction cache control 108 over a line 150. If the instruction cache control 150 sees that a current block of instructions contains a branch instruction, it will set the predicted executed bit for each instruction of the current block of instructions up to and including the branch instruction but will reset the predicted executed bit of each instruction of the current block of instructions following the branch instruction. As a result, the instruction decoder, when decoding the current block of instructions which contains a branch instruction will decode and dispatch all instructions of the current block of instructions up to and including the branch instruction but will not decode or dispatch any instruction of the current block of instructions following the branch instruction.

If the instruction decoder is able to dispatch all of the instructions up to and including the branch instruction, it will not assert the hold instruction fetch control signal. As a result, the next block array 104 will convey to the fetch program counter 110 address for the next block of instructions dictated by the branch instruction (i.e. the next block array contains the address of the predicted branch within that block) and to the store and predecode array 100 so that the nonsequential block of instructions will be available to the instruction decoder in the operating cycle during which the branch instruction is dispatched. Hence, when the current block of instructions which contains the branch instruction is dispatched up to and including the branch instruction, the instruction cache control 108 will note that the hold instruction fetch control signal is not asserted on line 64 and that all instructions up to and including the branch instruction have been dispatched as indicated by the instruction dispatch status control signals over bus 62.

If a branch is mispredicted, the instruction cache control 108 will receive at an input 152 a branch mispredict control signal from the branch functional unit required to handle the branch. If the instruction cache control 108 receives a branch mispredict control signal, it will then reset the predicted executed bits for all instructions of the next block of instructions. This causes the instruction decoder to not dispatch any instructions, to assert the hold instruction fetch control signal on line 64, and to indicate on buses 62 that no instructions were dispatched. This condition causes the current block of instructions to be continuously refreshed. As will be seen hereinafter, when the reorder buffer is depleted of its entries, the microprocessor current state is accurately represented by the contents of the register file. Then, all instructions currently on instruction buses 118a, 118b, 118c, and 118d are cleared and the next block array 104 provides the address of the block of instructions which contains the mispredicted branch instruction to the store and predecode array. Also, the next block array updates its branch predict tables and, for the block of instructions containing the mispredicted branch, sets the branch bit and the pointers and the next block array entry at that block so that when the mispredicted block is fetched again in the future, the branch within the block will be accurately predicted.

Figure 3:
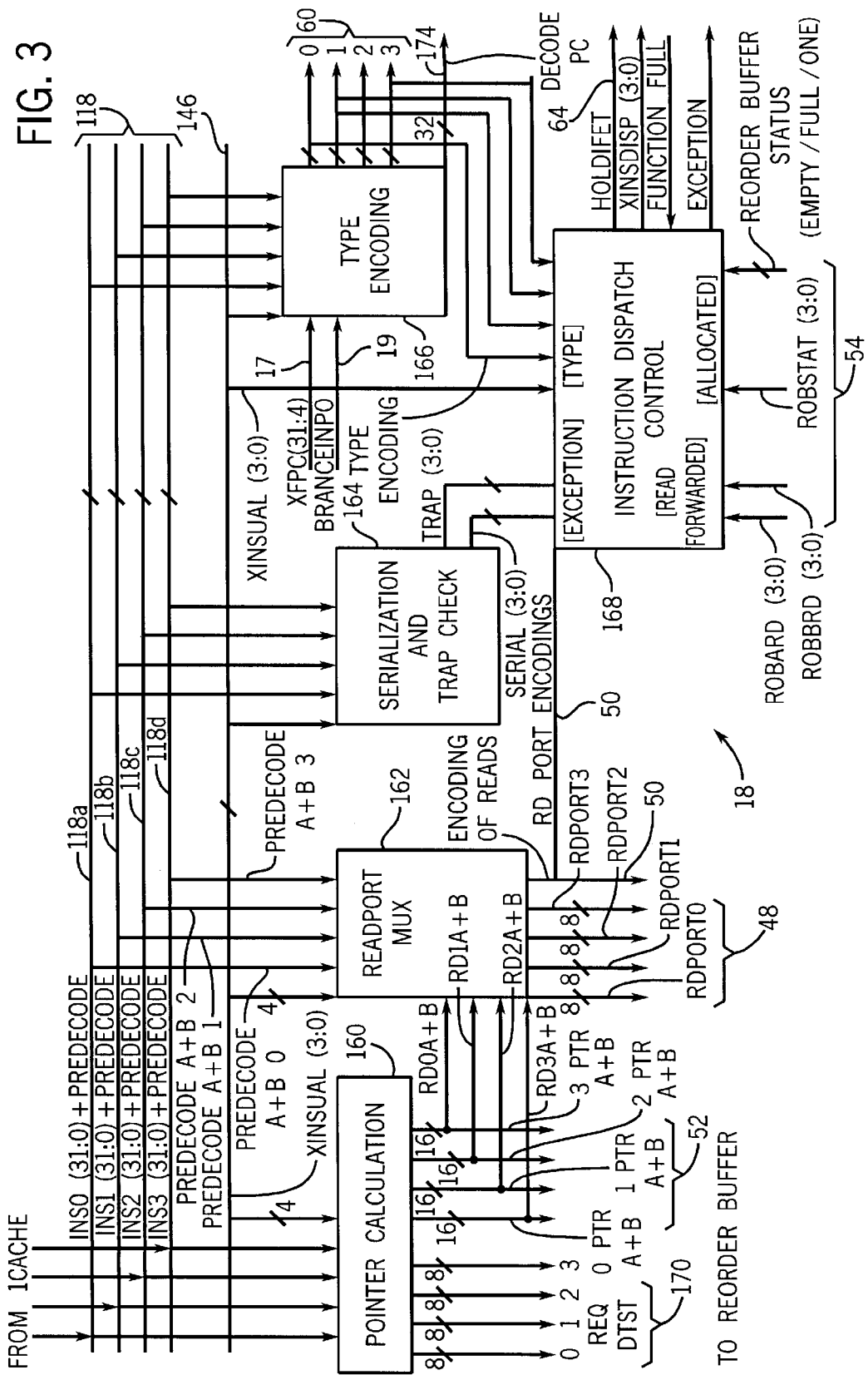
FIG. 3 is a detailed block diagram of the instruction decoder of FIG. 1.

Referring now to FIG. 3, it illustrates the instruction decoder 18 of FIG. 1 in greater detail. The instruction decoder 18 generally includes decoding means comprising a pointer calculation stage 160, a read port multiplexer 162, a serialization and trap checker 164, and a type encoder 166. The instruction decoder further includes an instruction dispatch control 168.

As will be noted in FIG. 3, each of the instruction decoder stages is coupled to the instruction buses 118. Hence, the instruction buses serve as input means of the instruction decoder 18.

The pointer calculation stage 160 is coupled to each of the instruction buses 118a, 118b, 118c, and 118d and receives therefrom the four predecoded bits associated with each instruction. The pointer calculation stage 160 generates on buses 52 the read pointers for the four instructions. Each read pointer bus of the buses 52 is arranged for providing 8 bit register file addresses for both an A operand and B operand which may be required for by each instruction.

The pointer calculation stage 160 also generates required write destination pointers on buses 170. Each bus of the buses 170 is arranged for providing an 8 bit register file address for each instruction where the final result of the execution of each instruction is to be finally stored when the corresponding instruction is retired.

Both the read pointer buses 52 and the write pointer buses 170 are coupled to the reorder buffer. The read pointers are coupled to the reorder buffer so that the reorder buffer may interrogate its entries to determine whether it can provide a forwarded operand for the execution of an instruction to be dispatched as previously described. The write pointer buses 170 provide the reorder buffer with the write pointers so that when an instruction is executed by a functional unit and its result is placed on the result buses, the functional unit will be able to associate with the result a destination tag previously provided by the reorder buffer in response to the write pointers.

As will also be noted in FIG. 3, the pointer calculation stage is also coupled to the buses 146 which provides the predicted executed bits with the instructions. If an instruction is not predicted executed (its predicted executed bit is reset) the pointer calculation stage 160 will not generate either read pointers or write pointers for that instruction. For example, if the predicted executed bits associated with instruction 0 and instruction 1 are reset and the predicted executed bits of instruction 2 and instruction 3 are set, the pointer calculation stage 160 will scan the four instructions and begin decoding and calculating the read and write pointers starting with instruction 2.

The read port multiplexer 162 serves as an allocating means for allocating the read ports of the register file for the instructions having their corresponding predicted executed bits set. To that end, the read port multiplexer is coupled to the buses 146 for receiving the predicted executed bits associated with the block of instructions. The read port multiplexer is further coupled to the instruction buses 118a, 118b, 118c, and 118d for receiving the two predecoded bits associated with each instruction which indicate the number of read ports required by each instruction. The read port multiplexer is also coupled to the pointer calculation stage for receiving the read pointers. Because the register file includes just four read ports, each of the buses 48 corresponds to a respective given one of the read ports and is arranged to provide an 8 bit register file address associated with each of the read ports. The read port multiplexer 162 also provides the encoding signals on bus 50 to cause the allocated read ports to be coupled to the proper instruction operand buses. The read port encode signals are also conveyed to the instruction dispatch control 168 so that the instruction dispatch control will know which register file read ports have been allocated.

The instruction dispatch control 168 also receives status signals over buses 54 from the reorder buffer. These status signals include signals which indicate for which instructions the reorder buffer is capable of providing forwarded operands. These signals include ROBARD to indicate for which instructions the reorder buffer is providing forwarded A operands and ROBBRD indicating the instructions for which the reorder buffer is providing B operands. As previously mentioned, whenever the reorder buffer is able to provide a forwarded operand for the execution of an instruction, a read port of the register file will not be allocated for that operand. This increases the capability for dispatching instructions by accommodating more operands than could be provided by the register file alone. As a result, the register file may include a fewer number of read ports than potentially required for the execution of all four instructions of a block of instructions.

The serialization and trap checker 164 is coupled to the instruction buses 118a, 118b, 118c, and 118d and scans each instruction for a serialization or trap condition. A serialization condition arises when a serialization instruction resides on one of the buses which is a specialized instruction requiring the microprocessor to be in a known state for its execution.

When a serialization condition is detected by the serialization and trap checker 164 while scanning a block of instructions, dispatch of the serialization instruction and all following instructions is prevented by the instruction dispatch control 168. When the instruction dispatch control dispatches all instructions up to the serialization condition, a latch is set that indicates a serialization instruction is next to be dispatched. Once all of the processing of existing instructions is finished indicated by the reorder buffer providing a signal on one of buses 54 indicating that the reorder buffer is empty or has no pending entries, the serialization instruction is dispatched. The serialization latch is not cleared until the serialization instruction has finished executing as indicated by the reorder buffer once again asserting on one of status lines 54 that it is once again empty. After the foregoing, the instruction decoder continues to decode and dispatch instructions as previously described.

When an exception condition is detected by the serialization and trap checker 164, the hold instruction fetch control signal is set which in combination with the assertion of an exception condition on line 172 causes the instruction cache 16 to clear all pending predicted executed bits and to fetch the first predicted block at the trap routine. The predicted block at the trap routine is fetched which is moved to the instruction cache on the bus 17 in a manner similar to a mispredicted branch. The location is then accessed via the store array and next block array 100. Hence, the decoding and dispatching of instructions for handling an exception condition is handled using the same protocol between the instruction decoder 18 and the instruction cache 16 as is utilized for all other blocks of instructions. The instruction decoder detects that all of the predicted executed bits are cleared so it doesn't dispatch any instructions until the new block of instructions from the beginning of the trap routine is presented to the instruction decoder by the instruction cache.

The type encoder 166 is also coupled to the instruction buses 118a, 118b, 118c, and 118d and is also coupled to the buses 146 for receiving the predicted executed bit associated with each instruction of the block of four instructions. The type encoder scans the four instructions in the ascending consecutive order until it finds the first instruction having its predicted executed bit set. The type encoder 166 then, responsive to the instruction word of the instruction, encodes the functional unit type and the opcode for the functional unit. The type encoder 166 provides the opcodes and types for each of the instructions on buses 60 with each bus of buses 60 corresponding to a respective given one of the instructions.

The type encoder 166 also provides with each block of instructions being dispatched the actual program counter count for the block of instructions being dispatched over a bus 174. The type encoder determines the actual program count from the external fetch program count received from the fetch program counter 110 of the instruction cache 116 over bus 17. The type encoder also receives branch information over bus 19 from the instruction cache control 108 for calculating the actual program count of a block of instructions being dispatched. Such actual program counter count may be required by some of the functional units as for example, a functional unit which executes a branch instruction. When the functional unit receives the actual program count for the block of instructions, by knowing the location of the instruction which it is to execute within the block, it is able to discern the actual program count for the instruction that it is executing. This is made possible by the fact that the instructions are arranged in consecutive ascending order and therefore, instruction 1 is offset from the actual program count of the block of instructions by one count, instruction 2 is offset by two counts, and instruction 3 is offset by three counts. Obviously, instruction 0 is not offset and its actual program count will be equal to the actual program count of the block of instructions.

The type encodings are also provided from the type encoder 106 to the instruction dispatch control 168. The instruction dispatch control 168 applies the instruction dispatch criteria to the instructions of each block of instructions presented to the instruction decoder by the instruction cache 16. The instruction dispatch control 168 maintains an accurate account of all resources within the microprocessor. It utilizes the read port encodings received on bus 50 for maintaining a record of the number of read ports which have been allocated. It also receives the status signals from the reorder buffer over buses 54 for receiving an indication from the reorder buffer as to which instructions it is providing an A operand, which instructions it is providing a B operand, and the number of entries that the reorder buffer could allocate by ROBSTAT. The reorder buffer also provides status signals indicating when the reorder buffer is empty (has not entries), when the reorder buffer is full and cannot accept any additional forwarded values, or when the reorder buffer has just one entry. The instruction dispatch control 168 also maintains a record of the available functional units and receives over buses 58 status signals from the functional units as to which functional units cannot accept any additional instructions.

As previously mentioned, the instruction dispatch control utilizes a dispatch criteria which it applies to the instructions of each block of instructions. The dispatch criteria first requires that all instructions be dispatched in order. As a result, if one instruction of a block of instructions cannot be dispatched, all instructions of that block of instructions following the instruction that cannot be dispatched are also not dispatched. In addition, if an instruction requires at least one read port which cannot be allocated and for which the reorder buffer cannot provide the required operand as a forwarded operand, that instruction will not be dispatched and all following instructions within that block of instructions will also not be dispatched. Once the instruction dispatch control 168 determines which instructions may be provided with required operands and hence dispatched, such instructions are considered to be conditionally dispatched. The instruction dispatch control 168 then determines which of these instructions have an available functional unit for executing the instructions. For example, if in a block of instructions, instruction 0 and instruction 1 can be provided with required operands but instruction 2 and instruction 3 cannot be provided with required operands, only instructions 0 and 1 will be considered conditionally dispatched. If there is an available functional unit for executing instruction 1 but not an available functional unit for execution instruction 0, no instructions of the current block of instructions will be dispatched. However, if there is an available functional unit for executing instruction 0 and not an available functional unit for executing instruction 1, the instruction dispatch control 168 will then dispatch instruction 0 only. When instruction 0 is dispatched, the instruction dispatch control will set the instruction dispatch status control bit for instruction 0 and will reset the instruction dispatch status control bits for instruction 1, instruction 2, and instruction 3. Also the instruction dispatch control 168 will set the hold instruction fetch control signal on line 64 to the set condition to cause the instruction cache to refresh the current block of instructions and represent the current block of instructions during the next operating cycle. When representing the refreshed block of instructions, the instruction cache control responsive to the instruction dispatch status bits will reset the predicted executed bit for instruction 0 and will set the predicted executed bits for instructions 1, 2, and 3 so that the instruction decoder will skip instruction 0 when decoding the refreshed block and begin allocating read ports and encoding type signals for the block of instructions beginning with instruction 1.

Figure 4:
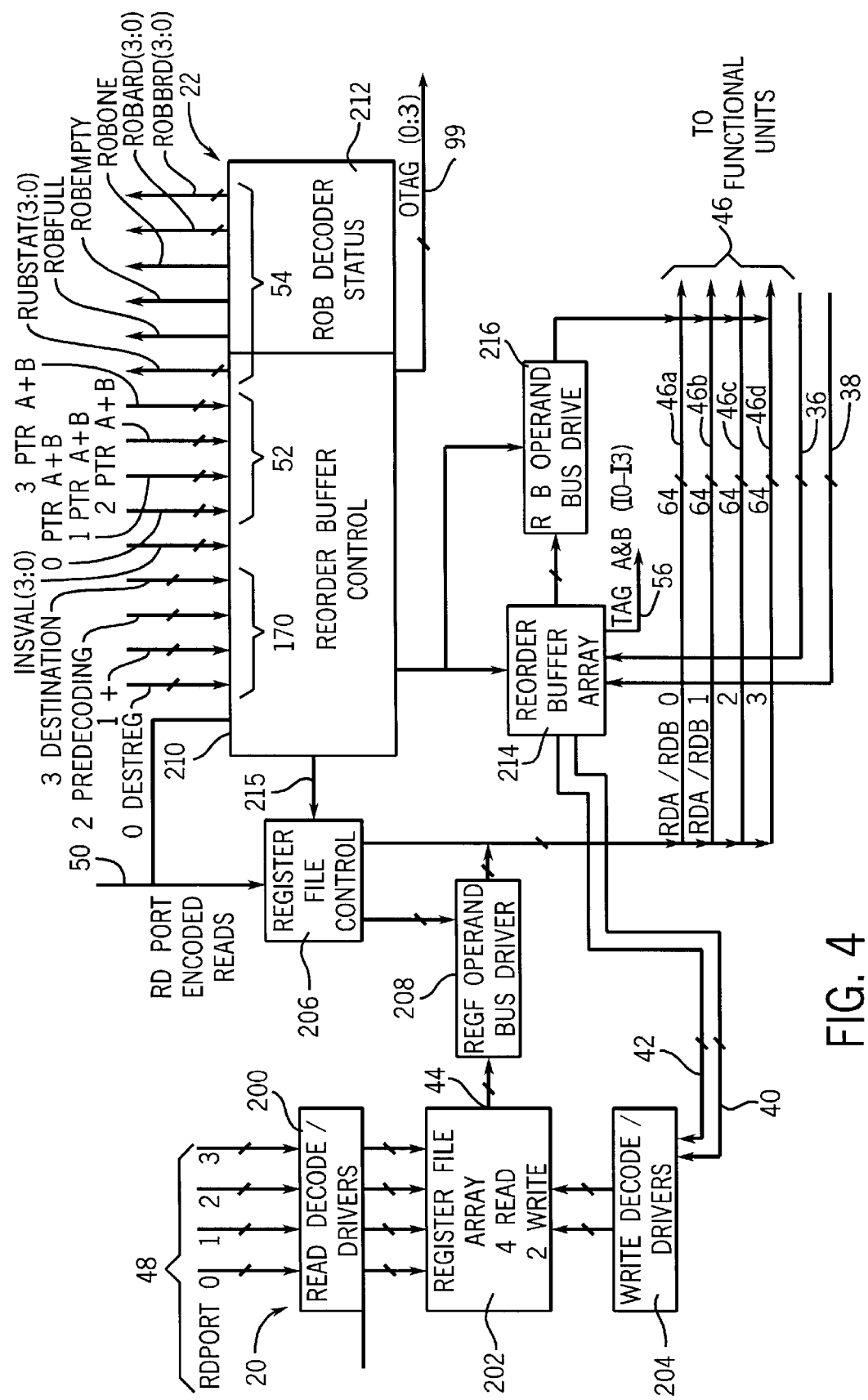
FIG. 4 is a detailed block diagram of the register file and reorder buffer of FIG. 1.

Referring now to FIG. 4, it illustrates the register file 20 and reorder buffer 22 in greater detail. The register file generally includes read decode drivers 200, a register file array 202, write decode drivers 204, a register file control 206, and a register file operand bus driver 208. The reorder buffer 22 generally includes a reorder buffer control 210, a reorder buffer decoder status section 212, a reorder buffer array 214, and a reorder buffer operand bus drive 216.

The register file array 202 of the register file 20 includes a plurality of addressable storage registers for storing the operand data required for the execution of instructions. The register file array 202 is accessed by the register file addresses provided by the read port multiplexer 162 of the instruction decoder 18 (FIG. 3) over address buses 48. The register file control 206 receives the read port encodings, also from the read port multiplexer 162, over bus 50. The register file control 206 is coupled to the register file operand bus driver 208 for controlling the shifting of the operand data from the four read ports 44 of the register file array 202 onto the operand buses 46. The register file control coordinates the shifting of the data so that operand data for instruction 0 is shifted onto operand bus 46a, operand data for instruction 1 is shifted onto operand bus 46b, instruction data for instruction 2 is shifted onto operand bus 46c, and operand data for instruction 3 is shifted onto operand bus 46d. The foregoing operand data is shifted onto the buses 46 when the corresponding instructions are dispatched by the instruction dispatch control 168 of the instruction decoder.

The reorder buffer array 214 is that portion of the reorder buffer which contains a plurality of entries for temporarily storing forwarded operands or results to be retired to the register file array 202 of the register file 20. The reorder buffer control receives the read pointers from the pointer calculation section 160 of the instruction decoder over buses 52. The reorder buffer control determines whether the reorder buffer array 214 is able to provide a required forwarded operand for the execution of an instruction. If the reorder buffer control 210 finds that the reorder buffer array 214 can provide a forwarded operand for an instruction being decoded, it conveys a control signal over line 215 to the register file control to cause the register file control to not output that operand data from one of its read ports. As a result, that read port which would otherwise be required to be allocated need not be allocated for executing the instruction. The reorder buffer control 210 then causes the reorder buffer decoder status to provide a status signal to the instruction dispatch control 168 of the instruction decoder 18 to indicate that the reorder buffer array 214 is providing the required forwarded operand data. The reorder buffer decoder status provides such control signals to the instruction dispatch control 168 over the control buses identified as ROBARD for indicating which instructions the reorder buffer array 214 is providing an A operand and ROBBRD for indicating which instructions the reorder buffer array 214 is providing an A operand. The reorder buffer decoder status 212 also provides the aforementioned status signal ROBSTAT to indicate the number of entries the reorder buffer array 214 has for providing forwarded operands for the instructions being decoded.

The reorder buffer control 210 also receives the write pointers from the pointer calculation section 160 of the instruction decoder 18 over buses 170. Each instruction which is dispatched is not only provided with required operand data, but in addition, is provided with a destination tag over buses 99 from the reorder buffer array. The destination tags are utilized by the functional units executing the instructions so that when they return a result over result buses 36 and 38 to the reorder buffer array 214 during write-back, the results are also accompanied with the tags received from the functional unit, which were originally driven upon dispatch by the reorder buffer. In this manner, the reorder buffer array 214 is able to arrange the received results in program order in case the received results are to be utilized by succeeding instructions.

The reorder buffer control 210 is also coupled to the reorder buffer operand bus drive 216. The reorder buffer operand bus drive is also coupled to the reorder buffer array for shifting the required forwarded operand data onto the operand buses 46. The reorder buffer operand bus drive 216 assures that required forwarded operand data for instruction 0 is driven onto operand bus 46a, that required forwarded operand data for instruction 1 is driven onto operand bus 46b, that required forwarded operand data for instruction 2 is driven onto operand bus 46c, and that required forwarded operand data for instruction 3 is driven onto operand bus 47d.

If instead of operand data a tag is driven onto one of the operand buses 46, the tag is compared to the tag accompanying a result value from a functional unit on one of the buses 36 or 38 by the functional unit requiring the result value as an operand. When the tag received from the reorder buffer array matches a tag on one of the result buses, the functional unit requiring the result as an operand receives that result as the required operand. This allows direct forwarding of operands from one functional unit to another. Each functional unit, as previously explained, looks at one potential instruction and only if a tag is produced on the operand buses for this particular instruction does the functional unit use a directly forwarded value on the result buses from another functional unit as an input operand.

As will also be noted in FIG. 4, the reorder buffer decoder status 212 also provides the aforementioned status signals indicating when the reorder buffer is full (ROBFULL), when the reorder buffer is empty (ROBEMPTY), and when the reorder buffer includes just one stored entry (ROBONE). As previously described, the instruction dispatch control 168 of the instruction decoder 18 utilizes the reorder buffer full control signal to determine when the reorder buffer array 214 is full and hence when the reorder buffer is incapable of receiving any additional results. The instruction dispatch control 168 further utilizes the reorder buffer empty control signal for handling serialization conditions and also the reorder buffer one control signal for handling serialization conditions.

As previously mentioned, the data stored in the register file array 202 represents the current execution state of the processor. On the other hand, the data stored in the reorder buffer array 214 represents the predicted execution state of the processor. When an instruction is to be retired, the corresponding result is first stored in the reorder buffer array 214. That result is conveyed to the register file array 202 over either bus 40 or bus 42 and through the write decode drivers 204 for storage in the register file array 202. Thereafter, the instruction is retired. For a more thorough description of the reorder buffer 22, reference may be had to copending application Ser. No. 07/464,918, filed Jan. 16, 1990, in the name of Thang Minh Tran and entitled APPARATUS FOR USE WITH A COMPUTING DEVICE FOR EXECUTING INSTRUCTIONS, which application is incorporated herein by reference and is assigned to the assignee of the present invention.

Figure 5:
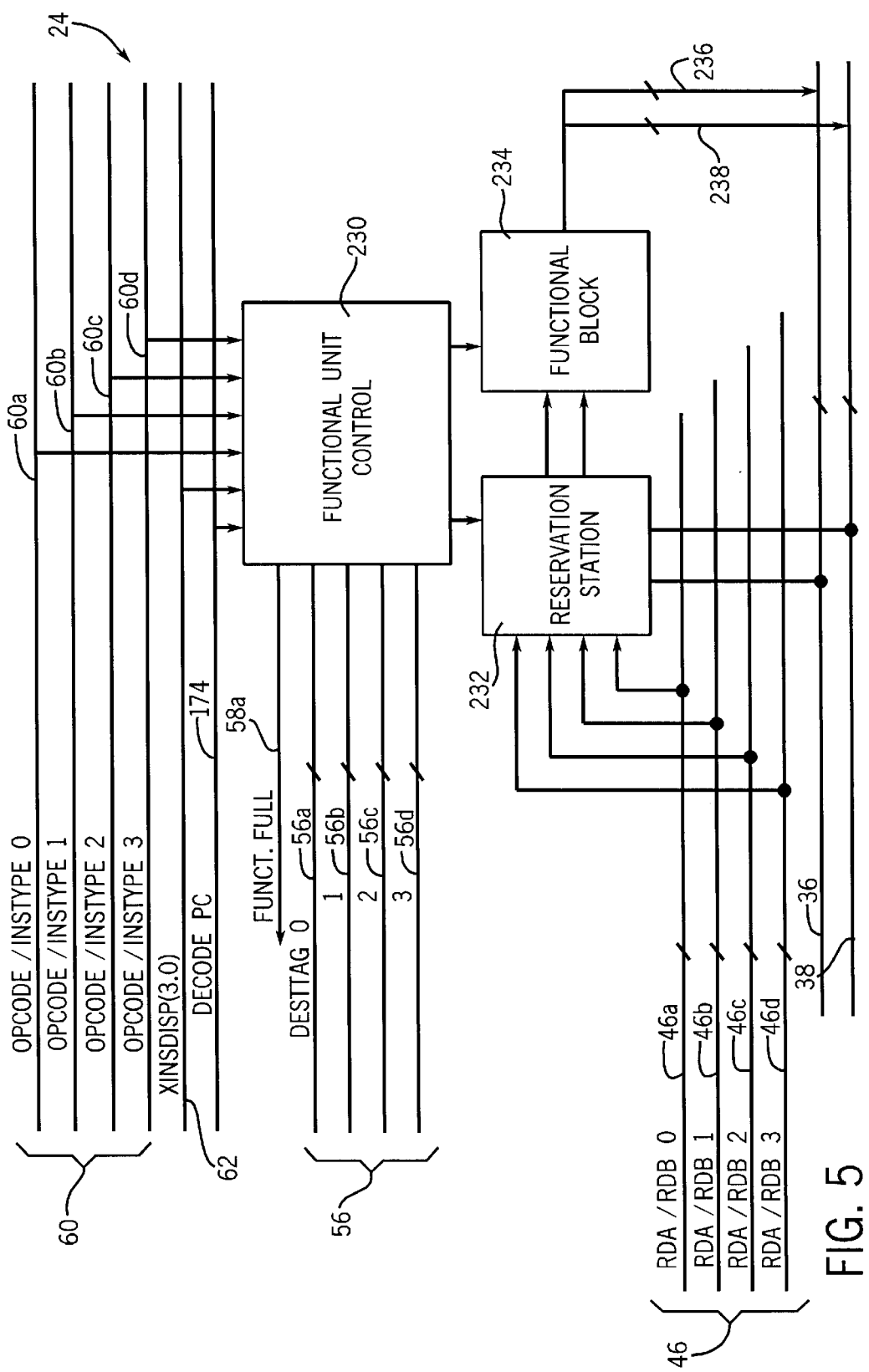
FIG. 5 is a detailed block diagram representing the structure of the functional units illustrated in FIG. 1.

Referring now to FIG. 5, it illustrates in greater detail the structure of one of the functional units 24 or 26 illustrated in FIG. 1. Since all functional units will have the same general configuration except for a different respective functional block, the functional unit of FIG. 5 will be referred to as the functional unit 24 illustrated in FIG. 1. The function unit 24 generally includes a functional unit control 230, a reservation station 232, and a functional block 234. The functional block 234 defines the particular operation that the functional unit 24 is capable of executing. As a result, a branch functional unit will have a branch functional block, a functional unit configured as an arithmetic logic unit will have an arithmetic logic unit functional block and so forth. In all other respects, the various functional units of the processor will be essentially identical and as illustrated in FIG. 5.

The functional unit control 230 is coupled to the opcode/instruction type buses 60 for receiving the opcodes and instruction types of each of the instructions of a block of four instructions. To that end, the functional unit control 230 is coupled to bus 60a for receiving the opcode and instruction type for instruction 0, to bus 60b for receiving the opcode and instruction type for instruction 1, to bus 60c for receiving the opcode and instruction type for instruction 2, and to bus 60d for receiving the opcode and instruction type for instruction 3. The opcodes and instruction types for the dispatched instructions are received by the functional unit control 230 from the type encoder 166 of the instruction decoder 18. The function unit control 230 is also coupled to the bus 62 for receiving the instruction dispatch control signals from the instruction dispatch control 168 of the instruction decoder 18. The function unit control 230 is further coupled to the destination tag buses 56 for receiving the destination tags from the reorder buffer array 214 of the reorder buffer 22. The buses 56 include one destination tag bus for each instruction. To that end, buses 56 include bus 56a for conveying the destination tag for the result of instruction 0, bus 56b for conveying the destination tag for the result of instruction 1, bus 56c for conveying the destination tag for the result of instruction 2, and bus 56d for conveying the destination tag for the result of instruction 3.

The reservation station 232 is a buffer for providing buffering of operand data locally to the functional unit 24. The reservation station 232 preferably includes sufficient storage for storing both A operands and B operands for up to, for example, two instructions. To that end, the reservation station 232 is coupled to bus 46a for receiving operand data for instruction 0, to bus 46b for receiving operand data for instruction 1, to bus 46c for receiving operand data for instruction 2, and bus 46d for receiving operand data for instruction 3. As previously mentioned, the operand data conveyed over buses 46 may be either forwarded operand data from the reorder buffer array 214 of the reorder buffer 22 or operand data from the register file array 202 of the register file 20.

The reservation station 232 is also coupled to the result buses 36 and 38 for receiving operand data which is directly forwarded to functional unit 24 from another functional unit. As previously described, the receipt of directly forwarded operand data from another functional unit is enabled by the receipt of a tag value in place of an operand value over one of the buses 46 received from the reorder buffer 22. When the tag value received over buses 46 matches the tag value associated with a result on bus 36 or 38, the reservation station 232 will then take in the corresponding result as a directly forwarded result operand from another one of the functional units.

The reservation station 232 in storing the operand data for a plurality of instructions also queues the operand data for execution of instructions in proper program order. The proper queuing of the instructions is made possible by the receipt of the decode program count received from the type encoder 166 over bus 174. When a functional unit needs the actual program count for an instruction being executed, the functional unit control 230 can calculate the actual program count for an individual instruction by knowing the decode program count received over bus 174 and the respective displacement of the instruction being executed from instruction 0 of its block. Such an actual program count is made possible by virtue of the fact that the four instructions of each block of instructions are arranged in consecutive ascending order.

The functional block 234 is coupled to the reservation station 232 for receiving the operand data for an instruction being executed. When the functional block 234 completes the execution of an instruction, during the next operating cycle which is the write-back phase of the executed instruction, the functional block 234 conveys the result of the execution to result bus 36 or result bus 38 over buses 236 or 238 respectively.

When the instructions of a block of instructions are in decode within the instruction decoder 18, the opcodes and instruction types for all instructions of the block of instructions are conveyed down the respective opcode and instruction type buses 60a, 60b, 60c, and 60d. Each functional unit control of each functional unit looks for the first encoded type that corresponds to it and the functional unit control then multiplexes the opcode and the operand bus corresponding to the instruction representing its type to its reservation station. This permits the functional unit 24 to set up early for receiving the operand data required for executing the instruction corresponding to its type. When the functional unit control 230 sees that the instruction corresponding to its type has been dispatched responsive to the instruction dispatch status control signals conveyed to it over bus 62, the functional unit control 230 causes the reservation station 232 to latch the operand data which, by this time, will reside on the corresponding one of operand buses 46a, 46b, 46c, or 46d. The reservation station 232 will at this time have stored therein the required operand data and the opcode for permitting the functional block 234 to execute the instruction during the next operating cycle of the processor.

As a specific example, if instruction 1 corresponds to the type of functional unit 24, the functional unit control 230 will detect its encoded type on bus 60b. It will immediately multiplex its inputs for conveying the opcode carried on bus 60b to the reservation station 232. It will also multiplex its inputs for receiving the destination tag from bus 56b and convey the destination tag to the reservation station 232. The functional unit control 230 also immediately causes the reservation station 232 to multiplex its inputs for receiving the operand data for instruction 1 from operand data bus 46b. When the functional unit control 230 detects that instruction 1 has been dispatched by the corresponding instruction dispatch status control bit of bus 62 being set, the functional unit control causes the reservation station 232 to latch the opcode for instruction 1, the destination tag for instruction 1, and the operand data required for executing instruction 1 in the reservation station 232. If the reservation station 232 had no pending instructions prior to the receipt of instruction 1, the functional unit 24 will then be able to execute instruction 1 during the next operating cycle of the processor during which time the functional unit 24 will be able to receive the next instruction dispatched to it in a similar manner. Of course, if a tag is sent to the reservation station 232 over bus 46b, the tag is compared to the tag values associated with the results on buses 36 and 38 for receiving directly forwarded operand values from another functional unit. The foregoing allows each functional unit to only look for one potential instruction at a time. If the reservation station 232 of functional unit 24 is full and hence rendering functional unit 24 incapable of receiving any additional instructions, this condition is conveyed back to the instruction dispatch control 168 of instruction decoder 18 over bus 58a from the functional unit control 230. When the bus 58a is combined with the other functional full buses of the other functional units, the multiple-bit bus 58 is created which is coupled to the instruction dispatch control 168 of instruction decoder 18 so that the instruction dispatch control 168 will not dispatch any instructions to those functional units which are incapable of receiving an additional instruction.

Figure 6:
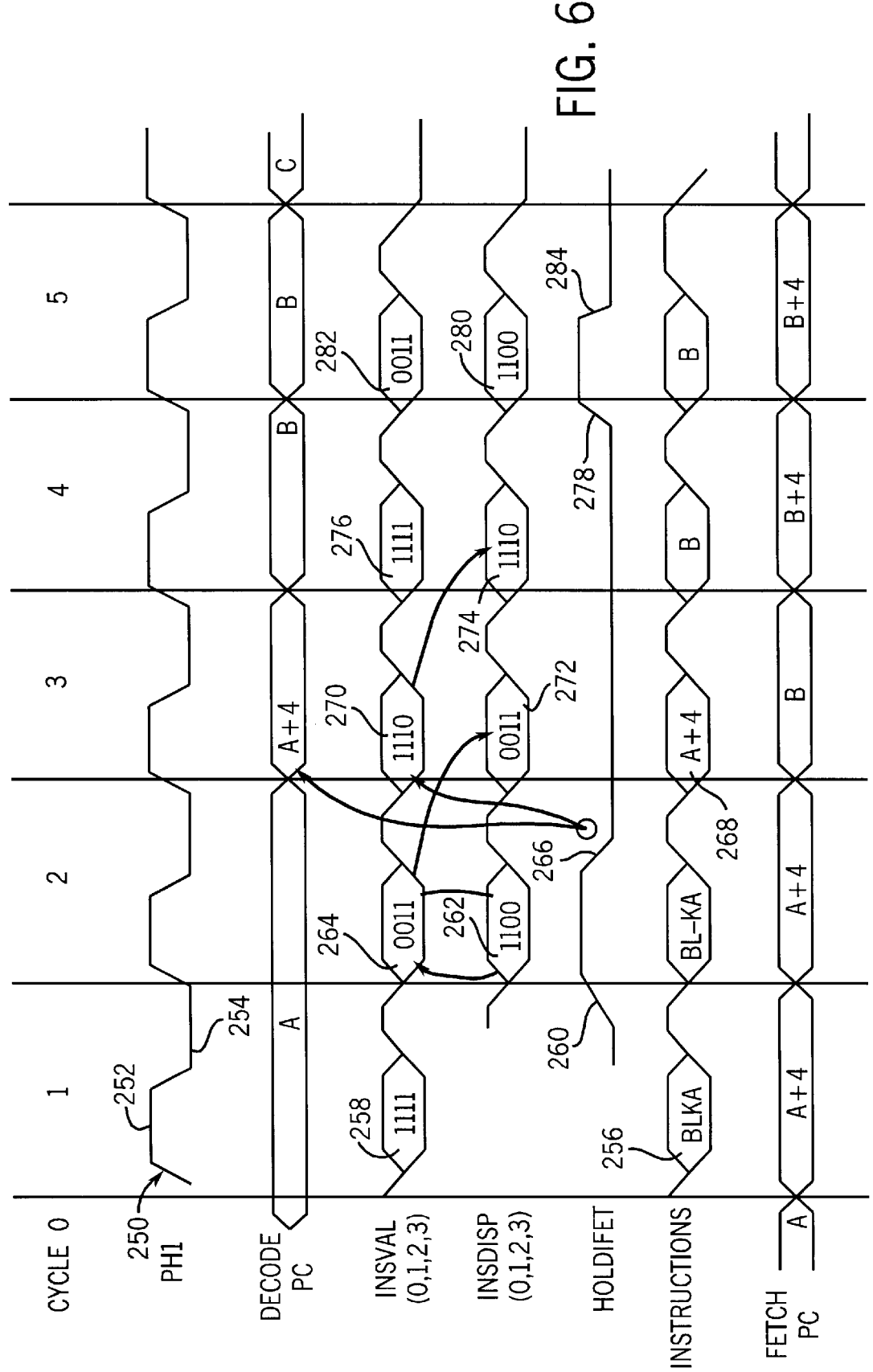
FIG. 6 is a timing diagram illustrating the operation of the instruction cache and instruction decoder of FIG. 1 for fetching, decoding, and dispatching a plurality of instructions in accordance with the present invention under various operating conditions to be described herein over six microprocessor operating cycles.

Referring now to FIG. 6, it illustrates a timing diagram which may be utilized to gain a further understanding of the protocol implemented between the instruction decoder 18 and instruction cache 16 for coordinating the decoding and dispatching of a plurality of instructions during each operating cycle of the processor 10. During this discussion, it may also be helpful to make reference to FIG. 1.

The timing diagram of FIG. 6 illustrates the operation of the instruction decoder 18 and instruction cache 16 over six processor operating cycles, cycles 0–5. Waveform 250 is the internal microprocessor clock waveform which defines the consecutive operating cycles of the processor. It will be noted that each operating cycle may be divided into a first half 252 wherein the internal clock is at a high level and a second half 254 wherein the internal clock is at a low level.

During the first illustrated cycle, cycle 0, the fetch program count is at address A. This causes the block of instructions corresponding to program count A to be prefetched by the instruction cache 16 for presentation to the instruction decoder 18 at the beginning of cycle 1.

During the first half of cycle 1, the block of instructions (BLKA) 256 corresponding to program count A is presented to the instruction decoder 18 whereupon the decode program count is set to program count A. The fetch program count is also incremented to program count address A+4 to enable the instruction cache to prefetch, for later presentation, to instruction decoder 18 the block of instructions, corresponding to program count A+4. The predicted executed bits 258 of each instruction of block A is set by the instruction cache 16. More specifically, the predicted executed bit for instruction 0 is set, the predicted executed bit for instruction 1 is set, the predicted executed bit for instruction 2 is set, and the predicted executed bit for instruction 3 is set.

Upon receipt of the four instructions of block A, the instruction decoder 18 scans the instructions in ascending consecutive order for decoding and possible dispatching of each instruction. During the second half of cycle one, the instruction decoder 18 determines that at least one of the four instructions of block A cannot be dispatched and therefore, during the second half of cycle 1, sets the hold instruction fetch control signal at 260. This notifies the instruction cache that not all of the instructions of block A will be dispatched during the first half of cycle 2 and that therefore the instruction cache should refresh instruction block A and represent instruction block A to the instruction decoder at the beginning of cycle 2.

As will be noted by the instruction dispatch status control bits 262 provided by the instruction decoder 18 at the beginning of cycle 2, instructions 0 and 1 are dispatched but instructions 2 and 3 are not dispatched. This can be noted from the fact that the instruction dispatch status control bits for instructions 0 and 1 are set but the instruction dispatch status control bits for instructions 2 and 3 are reset. As a result, and as will be noted from the predicted executed bits 264, in response to the instruction dispatch status control bits 262, and more specifically the instruction dispatch status control bits for instructions 0 and 1 being set, the instruction cache 16 resets the predicted executed bits for instructions 0 and 1 of instruction block A but maintains the predicted executed bits set for instructions 2 and 3 of block A.

At this point, the instruction decoder once again has all four instructions of instruction block A for decoding and the decode program count has been held at program count A. Also, the fetch program count has been held at program count A+4. Since the predicted executed bits for instructions 0 and 1 have been reset by the instruction cache, the instruction decoder, when scanning the four instructions of instruction block A in ascending consecutive order, will skip instructions 0 and 1 and begin decoding with instruction 2.

During the second half of cycle 2, the instruction decoder determines that it can dispatch instructions 2 and 3 of block A and therefore resets the hold instruction fetch control signal during the second half of cycle 2 at 266. This notifies the instruction cache that instructions 2 and 3 of block A will be dispatched at the beginning of cycle 3 and that therefore it should present the next block of instructions (A+4) of cycle 3.

At the beginning of cycle 3, the instruction cache provides the instruction decoder with the next block of instructions 268, block A+4, corresponding to program count A+4. Also, at the beginning of cycle 3, the instruction decoder provides the instruction cache with the dispatch status control bits 272 with the instruction dispatch status control bits for instructions 0 and 1 being reset because they are not being dispatched during cycle 3 since they were previously dispatched during cycle 2, and with the instruction dispatch status control bits for instructions 2 and 3 being set since these instructions are being dispatched.

For instruction block A+4, it will be noted from the predicted executed bits 270 that the instruction cache has set the predicted executed bits for instructions 0, 1, and 2 but has reset the predicted executed bit for instruction 3. This condition may be caused by instruction 2 within instruction block A+4 being a branch instruction requiring the next block of instructions fetched by the instruction cache to be obtained at a nonsequential fetch program count address such as program count B.

During the second half of cycle 3 the instruction decoder does not assert the hold instruction fetch control signal. This notifies the instruction cache that all of the instructions of instruction block A+4 which were predicted executed, namely, instructions 0, 1, and 2 will be dispatched at the beginning of cycle 4 and that, therefore, instruction block A+4 need not be refreshed and represented to the instruction decoder at the beginning of cycle 4. As a result, and because of the nonsequential fetch address required by the branch instruction of instruction 2 of block A+4, the next block array 104 (FIG. 2) of the instruction cache 16 sets the nonsequential fetch program count to program count B to enable prefetching of block B and presenting the same at the beginning of cycle 4.

When dispatching instructions 0, 1, and 2 of block A+4 at the beginning of cycle 4, the instruction decoder provides the instruction dispatch status control bits 274 wherein the instruction dispatch status control bits for instructions 0, 1, and 2 are set and the instruction dispatch status control bit for instruction 3 is reset. Also, the instruction cache provides instruction block B and the predicted executed bits 276 having the predicted executed bit for each of the four instructions of block B set for predicting each of these instructions executed. Also, the fetch program count is incremented to B+4.

Upon decoding instruction block B during the first half of cycle 4, the instruction decoder 18 determines that not all of the instructions of block B can be dispatched. As a result, during the second half of cycle 4, the instruction decoder once again asserts the hold instruction fetch control signal at 278. This notifies the instruction cache that it should refresh the instructions of block B and represent those instructions to the instruction decoder at the beginning of cycle 5. To that end, it will be noted that decode program count is held at count B and that the fetch program count is held at B+4 during cycle 5.

At the beginning of cycle 5, the instruction decoder dispatches instructions 0 and 1 of block B but not instructions 2 and 3 of block B. This may be discerned from the instruction dispatch status control bits 280 having the instruction dispatch status control bits for instructions 0 and 1 set but instruction dispatch status control bits for instructions 2 and 3 reset. As a result, when refreshing block B, the instruction cache provides the predicted executed bits 282 wherein the predicted executed bits for instructions 0 and 1 are reset for block B since these instructions have already been dispatched and wherein the predicted executed bits for instructions 2 and 3 are set because these instructions are yet to be dispatched. Lastly, during the second half of cycle 5, the instruction decoder resets the hold instruction fetch control signal at 284 to indicate to the instruction cache that instructions 2 and 3 of block B will be dispatched at the beginning of cycle 6 and that the instruction cache should then provide the next block of instructions which correspond to program count address B+4.

From the foregoing, it can be seen that the present invention provides a super-scalar microprocessor which is configured for performing operations upon a plurality of instructions at each of its fetch, decode, execute, and write-back stages. To support such operations, the super-scalar microprocessor of the present invention includes an instruction dispatch arrangement formed by the instruction decoder and instruction cache which fetches blocks of instructions, decodes blocks of instructions, and dispatches a plurality of instructions of the blocks of instructions in a coordinated manner pursuant to a unique protocol. A dispatch criteria is applied to each block of instructions to assure that only instructions which can be supported for execution by the functional units and which therefore can be provided with required operand data are dispatched. The protocol between the instruction decoder and the instruction cache further assures that instructions are dispatched in consecutive ascending program order. As a result, the operations performed upon the instructions at the various processor stages are coordinated to support proper in order execution of the instructions.

Figure 7:
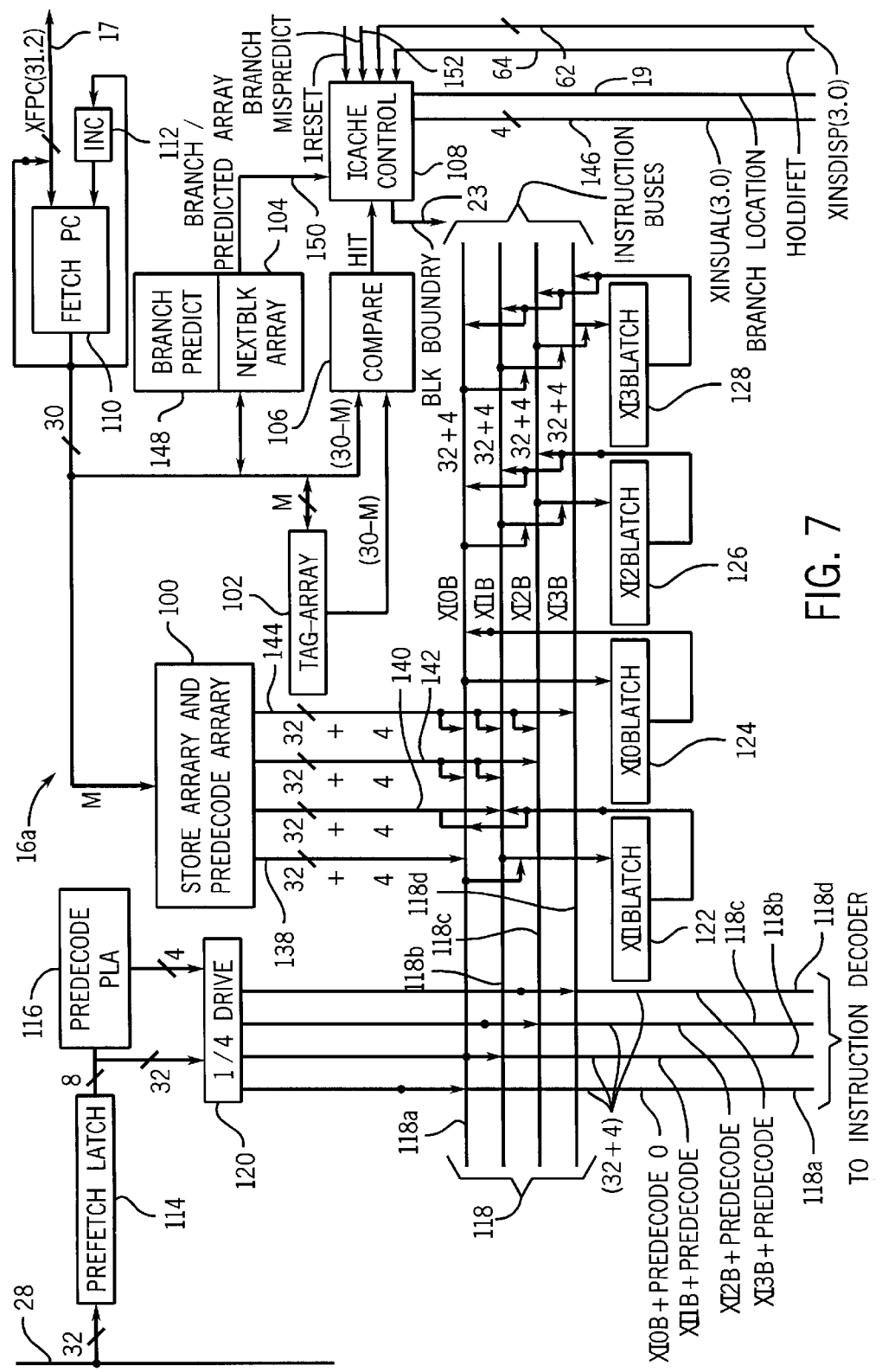
FIG. 7 is a detailed block diagram of another instruction cache configured in accordance with a second preferred embodiment of the present invention.

Referring now to FIG. 7, it illustrates in detailed block diagram form an instruction cache 16a configured in accordance with a second embodiment of the present invention. As will be noted, the instruction cache 16a is similar to the instruction cache 16 of FIG. 2. As a result, like reference numerals are incorporated throughout FIG. 7 to indicate identical elements.

The instruction cache 16a, as will be better seen with respect to FIG. 8, permits concatenation of the current and next block of instructions in the block oriented dispatch arrangement of the present invention to enable the instruction decoder to decode and dispatch a greater number of instructions during each microprocessor operating cycle. To that end, it will be noted that the output buses of the store and predecode arrange 100, in addition to the driving their dedicated or corresponding instruction buses are also arranged for driving the lower ordered instruction buses and thus, the lower ordered instruction latches. Hence, bus 138 is arranged for driving instruction bus 118a (instruction 0 bus), bus 140 is arranged for driving instruction buses 118a and 118b (instruction 0 and instruction 1 buses), bus 142 is arranged for driving instruction buses 118a, 118b, and 118c (instruction 0, instruction 1, and instruction 2 buses), and bus 144 is arranged for driving buses 118a, 118b, 118c, and 118d (instruction 0, instruction 1, instruction 2, and instruction 3 buses).

In addition, the outputs of instruction latches 124, 122, 126, and 128 are similarly arranged. If not all four instructions in decode are not dispatched, this permits the instruction cache to shift the oldest and next to be dispatched instruction down to the lowest ordered instruction bus and to fill in behind that instruction with as many instructions of the current and next block of instructions as can be accommodated. For example, if instructions 0 and 1 of a current block of instructions are dispatched, then instructions 2 and 3 of the current block are shifted to instruction buses 0 and 1 respectively (buses 118a and 118b) and instructions 0 and 1 of the next block are provided to instruction buses 2 and 3 (buses 118c and 118d) in order. As a result, instead of having just two instructions in decode, the instruction decoder will have a full four instructions in decode.

Since the instruction decoder 18 (FIG. 3) may have instructions from two consecutive blocks of instructions in decode during any one operating cycle, it must keep track of two decode program counters and the boundary between the instruction blocks. This is facilitated by the block boundary output 23 of the instruction cache control 108. For locating branches, the instruction decoder may utilize the branch location output 19 of the instruction cache control 108 as previously described.

In accordance with this embodiment, the instruction cache 16a still provides the predicted executed bits either set or reset with each instruction and the instruction decoder provides the dispatch status signals for those instructions being dispatched. This permits the appropriate instruction latches 124, 122, 126, and 128 to clear or be overwritten with a new instruction when an instruction it is currently storing is dispatched. The instruction decoder 18 also asserts the hold instruction fetch control signal under appropriate circumstances to hold the fetch program count of fetch program counter 110. This would be done if the instruction decoder does not have capacity for decoding instructions of a next block as, for example, if no instructions are dispatched or if so few instructions are dispatched that only instructions from a current two blocks will again be required during the next operating cycle.

FIG. 8 diagrammatically illustrates the operation of the instruction dispatch arrangement including instruction cache 16a and instruction decoder 18 in accordance with this second preferred embodiment over seven consecutive operating cycles under various dispatch conditions. For each operating cycle, the diagram of FIG. 8 illustrates the two program decoder counts (DECODE PC, NEXT PC), the fetch program count (FPC), the instructions being dispatched (IDISP), the instructions on the instruction buses (IBUSES), and the condition of the hold instruction fetch control signal (HOLDIFET).

During cycle 1, DECODE PC is set to A, denoting that instructions of block A are in decode, NEXT PC is undefined denoting that only instructions of block A are in decode, FPC is set to B denoting that the next new block of instructions to be fetched will be block B, and instructions A0, A1, A2, and A3 are on the instruction 0, 1, 2, and 3 buses respectively and are stored in latches 124, 122, 126, and 128 respectively. For this example, instruction A2 is a branch instruction to location B1 and hence instruction A3 is not predicted executed as denoted by the accompanying asterisk. During cycle 1, the instruction decoder determines that it will be able to dispatch instructions A0 and A1 but not instruction A2 for whatever reason and not instruction A3 since it is not predicted executed. However, since instruction A0 and A1 will be dispatched at the beginning of cycle 2, the instruction decoder will require instruction A2 again during cycle 2 and instructions from the next block, block B. Hence, HOLDIFET is not asserted and the FPC is forced to B by the next block array 104.

At the beginning of cycle 2, instructions A0 and A1 are dispatched, latch 126 drives instruction A2 onto bus 118A and into latch 124 and instructions B1, B2, and B3 are driven by the store and predecode array onto buses 118b, 118c, and 118d, and into latches 122, 126, and 128 respectively. Hence, instruction A2, the oldest instruction to be next dispatched is shifted to the instruction 0 bus and instructions B1, B2, and B3 of block B fill in behind and in order. Instruction A3 which was stored in latch 128 has been overwritten with instruction B3 because instruction A3 was not predicted executed.

During cycle 2, DECODE PC is set to A and NEXT PC is set to B since instructions from both blocks A and B are being decoded. Also, FPC is set to B+4 for fetching instructions of block B+4 which is the next block after block B. During cycle 2, the instruction decoder 18 determines that instruction A2 will be dispatched so that in cycle 3, only instruction of blocks B and B+4 will be decoded. As a result, HOLDIFET is not asserted to advance the fetch program counter 110 to B+8 to enable the prefetching of instructions from block B+8 when required.

At the beginning of cycle 3, instruction A2 is dispatched, instruction B1 is driven from latch 122 onto bus 118a and to latch 118a, instruction B2 is driven from latch 126 onto bus 118b and to latch 122, and instruction B3 is driven from latch 128 onto bus 118c and to latch 126. Lastly, instruction B4 is driven from the store and predecode array 100 onto bus 118c and to latch 128. DECODE PC is set to B, NEXT PC is set to B+4, and FPC remains at B+4 by virtue of HOLDIFET having been asserted in cycle 2.

During cycle 3, the instruction decoder determines that instructions B1 and B2 will be dispatched in cycle 4. Hence, during cycle 4 it will once again be decoding instruction from only block B and B+4 and will not have capacity for decoding instructions from block B+8. As a result, the instruction decoder asserts HOLDIFET to maintain FPC at B+4.

During cycle 4, DECODE PC is set to B (for instruction B3 being decoded) and NEXT PC is set to B+4 (for instructions B4, B5, and B6) being decoded. Instructions B1 and B2 are dispatched and instructions B3 and B4 are shifted to buses 118a and 118b and B respectively and instructions B5 and B6 fill in behind and in order. The instruction decoder determines that instructions B3, B4, and B5 will be dispatched in cycle 5 and that it will be decoding instructions from blocks B+4 and B+8. Hence, the instruction decoder 18 does not assert HOLDIFET during cycle 4 to permit FPC to advance to E in cycle 5. It does so because instruction B9 of block B+8 is a branch instruction to location E3. FPC is forced to E by the next block array 104 in a manner as previously described.

During cycle 5, instructions B3, B4, and B5 are dispatched, instruction B6 is shifted to buses 118a and instructions B7, B8, and B9 fill in behind. DECODE PC is at B+4 (for instructions B6 and B7 in decode) and NEXT PC is at B+8 (for instructions B8 and B9 in decode). The instruction decoder determines that instructions B6, B7, and B8 will be dispatched in cycle 6 and does not asserted HOLDIFET. Hence, in cycle 6, DECODE PC is set to B+8 (for instruction B9) and NEXT PC is set to E for instruction E3. Instructions B6, B7, and B8 are dispatched and instruction B9 is shifted as illustrated with instruction E3 filling in thereafter. It will be noted that the instruction buses are not full because instructions B9 and E3 represent different blocks. However, this example is an extreme case and most often, the instruction buses will be full with instructions.

Finally, in cycle 7, instructions B9 and E3 are dispatched and instructions E4, E5, E6, and E7 are driven onto the instruction buses in order by store and predecode array 100. DECODE PC is set to E+4 (for instructions E4, E5, E6, and E7 in decode), NEXT PC is undefined since the only instructions being decoded are from block E+4, and FPC is set to E+8 for prefetching instructions from the next block of instructions for cycle B.

While particular embodiments of the present invention have been shown and described, modifications may be made, and it is therefore intended to cover in the appended claims all such changes and modifications which fall within the true spirit and scope of the invention.

What is claimed is:

1. An instruction decoder for use in a processor, the processor including a source of instructions and a plurality of functional units for executing said instructions, said instruction decoder comprising:

input means coupled to said source of instructions for receiving a block of said instructions from said source of instructions, said block of instructions containing a plurality of said instructions;

decoding means for decoding selected ones of said instructions of said received block of instructions, said decoding means including dispatch control means for applying a dispatch criteria to said selected ones of said instructions of said received block of instructions; and output means coupled to said plurality of functional units and responsive to said dispatch control means for dispatching all of said selected instructions of said received block of instructions satisfying said dispatch criteria in parallel to said functional units, wherein said input means receiving a next block of said instructions from said source of instructions after all of said received block of instructions have been dispatched by said output means.

2. An instruction decoder as defined in claim 1 wherein said dispatch control means further includes means for providing a control signal having a first state indicating that all of said selected instructions of said received block of instructions have been dispatched, said control signal being applied to said source of instructions for causing said source of instructions, when said control signal is in said first state, to provide a further block of instructions to said instruction decoder input means.

3. An instruction decoder as defined in claim 2 wherein said control signal has a second state indicating that less than all of said selected instructions of said received block of instructions have been dispatched for causing said source of instructions to once again provide said block of instructions to said instruction decoder input means.

4. An instruction decoder as defined in claim 3 wherein said source of instructions provides a predicted executed signal accompanying each said instruction provided to said instruction decoder, each said predicted executed signal having a first state or a second state, wherein said selected instructions are those instructions accompanied by a predicted executed signal in said first state, and wherein said instruction decoder is responsive to said predicted executed signals for decoding and applying said dispatch criteria to only those instructions having a predicted executed signal in said first state.

5. An instruction decoder as defined in claim 4 wherein said dispatch control means further includes means for providing a set of dispatch status signals, each said dispatch status signal corresponding to a respective given one of said instructions of said received block of instructions, each said dispatch status signal having a first state indicating that its corresponding instruction has been dispatched or a second state indicating that its corresponding instruction has not been dispatched.

6. An instruction decoder as defined in claim 5 wherein said dispatch status signals are applied to said source of instructions for causing said source of instructions to set to said second state the predicted executed signals corresponding to the instructions which have been dispatched by said instruction decoder.

7. An instruction decoder as defined in claim 6 wherein said plurality of instructions of said received block of instructions are arranged in ascending order and wherein said decoding means scans said block of instructions in said ascending order and begins decoding and applying said dispatch criteria with the first one of said instructions having a predicted executed signal in said first state.

8. An instruction decoder as defined in claim 7 wherein said decoding means decodes and said dispatch control means applies said dispatch criteria to said selected instructions until one of said selected instructions fails to satisfy said dispatch criteria.

9. An instruction decoder as defined in claim 1 wherein said processor further includes register file means for storing operand data associated with said instructions, said register file means including a plurality of read ports for providing said plurality of functional units with said operand data, wherein each said instruction includes predecoded information indicating the number of read ports required for executing said instruction, and wherein said decoding means includes pointer means responsive to said predecoded information to generate read pointers and allocating means responsive to said read pointers for allocating said read ports for said block of said instructions.

10. An instruction decoder as defined in claim 9 wherein said read ports are fewer in number than potentially required for the execution of said selected instructions of said block of said instructions, wherein said allocating means allocates said read ports for said selected instructions until all said read ports are allocated, said allocating means being coupled to said dispatch control means, and wherein said dispatch control means precludes said output means from dispatching those selected instructions for which a required read port is not allocated.

11. An instruction decoder as defined in claim 10 wherein said plurality of instructions of said block of said instructions are arranged in ascending order and wherein said allocating means allocates said read ports to said instructions in said ascending order.

12. An instruction decoder as defined in claim 9 wherein said processor further includes buffer means for storing forwarded operands required by said instructions, said decoding means being coupled to said buffer means for providing said buffer means with said read pointers, wherein said buffer means is responsive to said read pointers for determining if its entries contain operand data required for executing said instructions, and wherein said buffer means provides said dispatch control means with status signals indicating for which ones of said selected instructions stores said forwarded operands.

13. An instruction decoder as defined in claim 12 wherein said dispatch control means is responsive to said status signals for not allocating said register file read ports for those ones of said selected instructions for which said buffer means stores said forwarded operands.

14. An instruction decoder as defined in claim 13 wherein said dispatch control means causes said output means to dispatch only those selected instructions which have required allocated read ports or for which said buffer means stores said forwarded operands.

15. An instruction decoder as defined in claim 1 wherein each said instruction includes an opcode, wherein said functional units are of different types, and wherein said decoding means includes a type decoder responsive to said opcode for decoding which type of said functional units is required for executing each said instruction and for providing type signals indicative of the type of functional unit required for executing each said instruction.

16. An instruction decoder as defined in claim 15 wherein each said functional unit has a capacity for receiving a finite number of instructions, wherein each said functional unit provides said dispatch control means with a status signal indicating its availability for receiving an instruction, wherein said type decoder is coupled to said dispatch control means for providing said dispatch control means with said type signals, and wherein said dispatch control means precludes said output means from dispatching a selected instruction when said status signal indicates that all functional units of a type required to execute said selected instruction are not available.

17. An instruction decoder as defined in claim 16 wherein said plurality of said instructions of said received block of instructions are received by said input means in ascending order and wherein said dispatch control means ceases dispatching instructions of said block of instructions upon precluding a selected one of said instructions from being dispatched.

18. An instruction dispatch arrangement for use in a microprocessor, the microprocessor including multiple functional units and configured for executing a plurality of instructions during each microprocessor operating cycle, said instruction dispatch arrangement comprising:

an instruction source for providing a block of said instructions during each said operating cycle, said block of instructions including a plurality of said instructions, said instruction source also providing a predicted executed bit with selected ones of said instructions of said block of instructions; and instruction decoder means coupled to said instruction source for applying a dispatch criteria to said selected instructions of said block of said instructions and dispatching to said functional units for execution all said selected instructions satisfying said dispatch criteria; and wherein said microprocessor further includes register file means for storing operand data associated with said instructions, said register file means including a plurality of read ports for providing said multiple functional units with said operand data, wherein each instruction of said instructions includes predecoded information indicating the number of read ports required for executing said instruction, and wherein said instruction decoder means includes pointer means responsive to said predecoded information for generating read pointers and allocating means responsive to said read pointers for allocating said read ports for said block of instructions.

19. An arrangement as defined in claim 18 wherein said instruction source provides said block of said instructions and said instruction decoder means applies said dispatch criteria at the beginning of a first operating cycle and wherein said instruction decoder means dispatches said selected instructions satisfying said dispatch criteria at the beginning of the operating cycle immediately following said first operating cycle.

20. An arrangement as defined in claim 18 wherein said instruction source provides said block of instructions and said instruction decoder means applies said dispatch criteria at the beginning of a first operating cycle and wherein said instruction decoder means dispatches said selected instructions satisfying said dispatch criteria at the beginning of the operating cycle immediately following said first operating cycle.

21. An arrangement as defined in claim 20 wherein said read ports are fewer in number than potentially required for the execution of said selected ones of said instructions of said block of said plurality of instructions, wherein said allocating means allocates said read ports for said selected ones of said instructions until all said read ports are allocated, and wherein said instruction decoder means dispatches only those selected instructions which either do not require any of said read ports or which require a number of said read ports and for which said required number of said read ports have been allocated.

22. An arrangement as defined in claim 21 wherein said plurality of instructions of said block of instructions are arranged in ascending order and wherein said allocating means allocates said read ports to said selected instructions one at a time in said ascending order.

23. An arrangement as defined in claim 20 wherein said microprocessor further includes buffer means for storing forwarded operarand data required by said instructions, said buffer means including a plurality of entries for storing said forwarded operand data, wherein said buffer means is coupled to said pointer means and responsive to said read pointers for determining if its entries contain operand data required for executing said instruction, and wherein said buffer means provides said instruction decoder means with status signals indicating for which ones of said selected instructions it can provide required operand data.

24. An arrangement as defined in claim 23 wherein said instruction decoder means is responsive to said status signals for not allocating said read ports for those ones of said selected instructions for which said buffer means stores said forwarded operand data.

25. An arrangement as defined in claim 24 wherein said instruction decoder means dispatches only those selected instructions which have required allocated read ports or for which said buffer means stores said forward operand data.

26. An arrangement as defined in claim 25 wherein said plurality of instructions of said block of instructions are arranged in consecutive ascending order and wherein said instruction decoder means ceases the dispatching of said selected instructions with the first one of said selected instructions which does not have a required allocated read port or for which said buffer means stores said forwarded operand data.

27. An arrangement as defined in claim 18 wherein each said instruction includes an opcode, wherein said multiple functional units are of different types, and wherein said instruction decoder means includes a type decoder responsive to said opcode for decoding which type of each functional unit of said functional units is required for executing each said instruction and for providing type signals indicative of the type of the functional unit required for executing each said instruction.

28. An arrangement as defined in claim 27 wherein each said functional unit has a capacity for receiving a finite number of instructions, wherein each said functional unit provides said instruction decoder means with a status signal indicating its availability for receiving an instruction, and wherein said instruction decoder means dispatches only those selected instructions which either do not require one of said functional units or those selected instructions which require a type of functional unit and for which said type of functional unit is available.

29. An arrangement as defined in claim 28 wherein said plurality of said instructions of said block of instructions are arranged in ascending order and wherein said instruction decoder means does not dispatch those instructions of said block of instructions beyond a selected instruction for which a required type of functional unit is unavailable.

30. An arrangement as defined in claim 29 wherein said instruction decoder means conveys said opcodes and said type signals to said functional units when dispatching said instructions.

31. An arrangement as defined in claim 30 wherein said instruction source includes a fetch program counter for providing a fetch program count to address said blocks of instructions, wherein said instruction of each said block of instructions are arranged in consecutive order having actual program counts related to said fetch program counts, and wherein said instruction decoder means provides said functional units with said actual program counts upon dispatching the corresponding instructions.

32. An arrangement as defined in claim 30 wherein said instruction decoder means further provides said functional units with a set of dispatch status signals, each said dispatch status signal corresponding to a respective given one of said instructions of said block of instructions, each said dispatch status signals having a first state indicating that its corresponding instruction has been dispatched or a second state indicating that its corresponding instruction has not been dispatched.

33. An instruction dispatch arrangement for use in a microprocessor of the type including multiple functional units and configured for executing a plurality of instructions during each microprocessor operating cycle, said instruction dispatch arrangement comprising:

an instruction source for providing a block of said instructions during each said microprocessor operating cycle, said block of instructions including a plurality of said instructions, said instruction source also providing a predicted executed bit with selected ones of said instructions of said block of instructions; and instruction decoder means coupled to said instruction source for applying a dispatch criteria to said selected instructions of said block of instructions and dispatching to said multiple functional units for execution of all said selected instructions satisfying said dispatch criteria, wherein said instruction source provides said block of instructions and said instruction decoder means applies said dispatch criteria at the beginning of a first operating cycle and wherein said instruction decoder means dispatches said selected instructions satisfying said dispatch criteria at the beginning of the operating cycle immediately following said first cycle;

wherein said instruction decoder means provides said instruction source with a control signal upon dispatching said selected instructions satisfying said dispatch criteria, said control signal having a first state indicating that all said selected instructions have been dispatched to cause said instruction source to provide a next said block of instructions or a second state indicating that less than all of said selected instructions have been dispatched to cause said instruction source to once again provide the present said block of instructions to said instruction decoder means.

34. An arrangement as defined in claim 33 wherein said instruction decoder means further provides said instruction source with a set of dispatch status signals along with said control signal, each said set of dispatch status signal corresponding to a respective given one of said instructions of said block of said instructions, each said set of dispatch status signal having a first state indicating that its corresponding instruction has been dispatched or a second state indicating that its corresponding instruction has not been dispatched.

35. An arrangement as defined in claim 34 wherein said instruction source is responsive to said set of dispatch status signals in said first state for clearing said predicted executed bit associated with said instructions which have been dispatched upon once again providing said blocks of instructions to said instruction decoder means.

36. An arrangement as defined in claim 35 wherein said instruction source provides said block of said plurality of instructions in ascending order and wherein said instruction decoder means scans said plurality of instructions in said ascending order from a first one of said instructions and begins applying said dispatch criteria to said selected instructions with the first selected one of said instructions.

37. An arrangement as defined in claim 36 wherein said instruction decoder means terminates applying said dispatch criteria to said instructions with said one of said selected instructions failing to satisfy said dispatch criteria.

38. An arrangement as defined in claim 37 wherein said instruction source includes a fetch program counter for fetching each said block of instructions and a next block array and an incremented means for updating said fetch program counter when all said selected instructions of a block of instructions have been dispatched to cause said fetch program counter to fetch said next blockarray.

39. An arrangement as defined in claim 38 wherein said instruction source further includes a plurality of latches, each said latch corresponding to a respective given one of said instructions of each said block of instructions, and wherein said latches temporarily store said instructions of each said of instructions to enable said instruction source to once again provide a said a present block of instruction should less than all of said selected instructions be dispatched.

40. An arrangement as defined in claim 38 wherein said next block array includes branch predict means for predicting when one of the selected instructions of a said block of instructions is a branch instruction requiring a non-sequential fetch program counter address for the next block of instructions and wherein said next block array means sets said fetch program counter to said non-sequential fetch program counter address for fetching the next block of instructions corresponding to said non-sequential fetch program counter address when all said selected instructions up to and including said branch instructions have been dispatched.

41. An arrangement as defined in claim 40 wherein said next block array maintains for each said block of instructions a branch bit which, if set, predicts that one of said instructions is a branch instruction.

42. An arrangement as defined in claim 41 wherein said next block array further maintains, for each said block of instructions having a corresponding branch bit set, a plurality of pointer bits indicating which one of said instructions is the branch instruction.

43. An arrangement as defined in claim 42 wherein said instruction source is responsive to said pointer bits for resetting the predicted executed bit of all the instructions of said block of instructions after said branch instruction.

44. A microprocessor arranged to execute at least one instruction during each cycle of consecutive operating cycles, said microprocessor comprising:

instruction source means for providing a block of instructions during a present one of said operating cycles, said block of instructions including a plurality of said instructions, said instruction source means providing with each said instruction a predicted executed bit, said predicted executed bit being set for selected ones of said instructions;

instruction decoder means coupled to said instruction source means for decoding and applying a dispatch criteria to said selected ones of said plurality of said instructions of said block of instructions during said present operating cycle and for dispatching during the next operating cycle immediately following said present operating cycle all said selected instructions satisfying said dispatch criteria; and a plurality of functional units coupled to said instruction decoder means for receiving said dispatched instructions during said next operating cycle immediately following said present operating cycle for executing said dispatched instructions; and wherein said microprocessor further includes register file means for storing operand data associated with said instructions, said register file means including a plurality of read ports for providing said functional units with said operand data, wherein each said instruction includes predecoded information indicating the number of read ports required for executing said instruction, and wherein said instruction decoder means includes pointer means responsive to said predecoded information for generating read pointers and allocating means responsive to said read pointers for allocating said read ports for said block of instructions.

45. A microprocessor as defined in claim 44 wherein said instruction decoder means dispatches said selected instructions satisfying said dispatch criteria in parallel to said functional units.

46. A microprocessor as defined in claim 44 wherein said instruction decoder means provides said instruction source means with a control signal upon dispatching said selected instructions satisfying said dispatch criteria, said control signal having a first state indicating that all said selected instructions have been dispatched to cause said instruction source means to provide a next said block of instructions during said next operating cycle or a second state indicating that less than all of said selected instructions have been dispatched to cause said instruction source means to once again provide the present said block of instructions to said instruction decoder means during said next operating cycle.

47. A microprocessor as defined in claim 46 wherein said read ports are fewer in number than potentially required for the execution of said selected instructions of said block of instructions, wherein said allocating means allocates said read ports for said selected instructions until all said read ports are allocated, and wherein said instruction decoder means dispatches only those selected instructions which either do not require any of said read ports or which require a number of said read ports and for which said required number of said read ports have been allocated.

48. A microprocessor as defined in claim 47 wherein said plurality of instructions of said block of instructions are arranged in consecutive ascending order and wherein said allocating means allocates said read ports to said selected instructions one at a time in said consecutive ascending order.

49. A microprocessor as defined in claim 46 wherein said microprocessor further includes buffer means for storing forwarded operand data required by said instructions, said buffer means including a plurality of entries for storing said forwarded operand data, wherein said buffer means is coupled to said pointer means and responsive to said read pointers for determining if its entries contain operand data required for executing said instructions, and wherein said buffer means provides said instruction decoder means with status signals indicating for which ones of said selected instructions it can provide required operand data.

50. A microprocessor as defined in claim 49 wherein said instruction decoder means is responsive to said status signals for not allocating said register file read ports for those ones of said selected instructions for which said buffer means stores said forwarded operand data.

51. A microprocessor as defined in claim 50 wherein said instruction decoder means dispatches only those selected instructions which have required allocated read ports for which said buffer means stores said forwarded operand data.

52. A microprocessor as defined in claim 51 wherein said plurality of instructions of said block of instructions are arranged in consecutive ascending order and wherein said instruction decoder means ceases the dispatching of said selected instruction with the first one of said selected instructions which does not have a required allocated read port or which cannot be provided with required operand data from said buffer means.

53. A microprocessor arranged to execute at least one instruction during each cycle of consecutive operating cycles, said microprocessor comprising:

instruction source means for providing a block of instructions during a present one of said operating cycles, said block of instructions including a plurality of said instructions, said instruction source means providing with each said instruction a predicted executed bit, said predicted executed bit being set for selected ones of said instructions;

instruction decoder means coupled to said instruction source means for decoding and applying a dispatch criteria to said selected ones of said plurality of said instructions of said block of instructions during said present one of said consecutive operating cycle and for dispatching during a next operating cycle immediately following said present one of said consecutive operating cycles all said selected instructions satisfying said dispatch criteria;

a plurality of functional units coupled to said instruction decoder means for receiving said dispatched instructions during said next operating cycle immediately following said present one of said operating cycle for executing said dispatched instructions;

wherein said instruction decoder means dispatches said selected instructions satisfying said dispatch criteria in parallel to said functional units; and wherein said instruction decoder means provides said instruction source means with a control signal upon dispatching said selected instructions satisfying said dispatch criteria, said control signal having a first state indicating that all said selected instructions have been dispatched to cause said instruction source means to provide a next said block of instructions during said next operating cycle or a second state indicating that less than all of said selected instructions have been dispatched to cause said instruction source means to once again provide the present said block of instructions to said instruction decoder means during said next operating cycle.

54. A microprocessor as defined in claim 53 wherein said instruction decoder means further provides said instruction source means with a set of dispatch status signals along with said control signal, each said dispatch status signal corresponding to a respective given one of said instructions of said block of instructions, each said dispatch status signal having a first state indicating that its corresponding instruction has been dispatched or a second state indicating that its corresponding instruction has not been dispatched.

55. A microprocessor as defined in claim 54 wherein said instruction source means is responsive to said dispatch status signals in said first state for clearing said predicted executed bits associated with said instructions which have been dispatched upon once again providing said block of instructions to said instruction decoder means during said next operating cycle.

56. A microprocessor as defined in claim 55 wherein said instruction source means provides said plurality of said instructions of said block of instructions in consecutive ascending order and wherein said instruction decoder means scans said plurality of instructions in said ascending order from a first selected one of said instructions and begins applying said dispatch criteria to said selected instructions with the first selected one of said instructions.

57. A microprocessor as defined in claim 56 wherein said instruction decoder means terminates applying said dispatch criteria to said instructions with the first selected one of said instructions failing to satisfy said dispatch criteria.

58. A microprocessor as defined in claim 57 wherein said instruction source means includes a fetch program counter for providing addresses for fetching each said block of instructions and a next block array means for incrementing said fetch program counter when all said selected instructions of a block of instructions have been dispatched to cause said fetch program counter to address and fetch said next block of instructions.

59. A microprocessor as defined in claim 58 wherein said instruction source means further includes a plurality of latches, each said latch corresponding to a respective given one of said instructions of each said block of instructions and wherein said latches temporarily store said instructions of each said block of instructions to enable said instruction source means to once again provide said present block of instruction should less than all of said selected instructions be dispatched.

60. A microprocessor as defined in claim 58 wherein said next block array means includes branch predict means for predicting when one of the selected instructions of a said block of instructions is a branch instruction requiring a non-sequential fetch program counter address for the next block of instructions and wherein said next block array means sets said fetch program counter to said non-sequential fetch program counter address for fetching the next block of instructions corresponding to said non-sequential fetch program counter address when all said selected instructions up to and including said branch instruction have been dispatched.

61. A microprocessor as defined in claim 60 wherein said next block array means maintains for each said block of instructions a branch bit which, if set, predicts that one of said instructions is a branch instruction.

62. A microprocessor as defined in claim 61 wherein said next block array means further maintains, for each said block of instructions having a corresponding branch bit set, a plurality of pointer bits indicating which one of said instructions is the branch instruction.

63. A microprocessor as defined in claim 62 wherein said instruction source means is responsive to said pointer bits for resetting the predicted executed bits of all the instructions of said block of instructions after said branch instruction.

64. A microprocessor arranged to execute at least one instruction during each cycle of consecutive operating cycles, said microprocessor comprising:
    instruction source means for providing a block of instructions during a present one of said operating cycles, said block of instructions including a plurality of said instructions, said instruction source means providing with each said instruction a predicted executed bit, said predicted executed bit being set for selected ones of said instructions;
    instruction decoder means coupled to said instruction source means for decoding and applying a dispatch criteria to said selected ones of said plurality of said instructions of said block of instructions during said present operating cycles and for dispatching during the next operating cycle immediately following said present one of said operating cycles all said selected ones of said instructions satisfying said dispatch criteria;
    a plurality of functional units coupled to said instruction decoder means for receiving said dispatched instructions during said next operating cycle immediately following said present operating cycle for executing said dispatched instructions wherein each said instruction includes an opcode, wherein said functional units are of different types, and wherein said instruction decoder means includes a type decoder responsive to said opcodes for decoding which type of said functional units is required for executing each said instruction and for providing type signals indicative of the type of functional units required for executing each said instruction; and
    wherein each said functional unit has a capacity for receiving a finite number of instructions, wherein said each said functional unit provides said instruction decoder means with a status signal indicating its availability for receiving an instruction, and wherein said instruction decoder means dispatches only those selected instructions which either do not require one of said functional units or those selected instruction which require a type of functional unit and for which said type of functional unit is available.

65. A microprocessor as defined in claim 64 wherein said instruction decoder means dispatches said selected instructions satisfying said dispatch criteria in parallel to said functional units wherein said instruction decoder means provides said instruction source means with a control signal upon dispatching said selected instructions satisfying said dispatch criteria, said control signal having a first state indicating that all said selected instructions have been dispatched to cause said instruction source means to provide a next said block of instructions during said next operating cycle or a second state indicating that less than all of said selected instructions have been dispatched to cause said instruction source means to once again provide the present said block of instructions to said instruction decoder means during said next operating cycle.

66. A microprocessor as defined in claim 65 wherein said plurality of said instructions of said block of instruction are arranged in ascending order and wherein said instruction decoder means does not dispatch those instructions of said block of instructions beyond a selected instruction for which a required type of functional unit is unavailable.

67. A microprocessor as defined in claim 66 wherein said instruction decoder means conveys said opcodes and said type signals to said functional units when dispatching said instructions.

68. A microprocessor as defined in claim 67 wherein said instruction decoder means further provides said functional units with a set of dispatch status signals, each said dispatch status signal corresponding to a respective given one of said instructions of said block of instructions, each said dispatch status signal having a first state indicating that its corresponding instruction has been dispatched or a second state indicating that its corresponding instruction has not been dispatched.

69. A microprocessor as defined in claim 68 wherein said instruction decoder means dispatches said opcodes to each said functional unit in parallel with said type signals and wherein each said functional unit include control means for comparing its type with said type signals and is responsive to said dispatch status signals for receiving an opcode when a type signal corresponds to its type.

70. A microprocessor as defined in claim 69 further including register file means for conveying operand data to said functional units.

71. A microprocessor as defined in claim 70 further comprising buffer means for conveying operand data to said functional units.

72. A microprocessor as defined in claim 71 further including a common operand bus coupling said buffer means and said register file means to said functional units for conveying said operand data to said functional units.

73. A microprocessor as defined in claim 72 wherein each said functional unit includes a buffer coupled to said common operand bus for receiving and temporarily storing said operand data.

74. A microprocessor as defined in claim 73 further including a result bus coupled between said functional units and said buffer means and wherein said functional units convey result values to said buffer means over said result bus.

75. A microprocessor as defined in claim 74 wherein said buffer means is coupled to said register file means for conveying said result values from said buffer means to said register file means.

76. A microprocessor as defined in claim 74 wherein each said functional unit conveys result values to other said functional units over said result bus.

77. A microprocessor as defined in claim 69 wherein said instruction source means includes a fetch program counter for providing a fetch program count to address and fetch said blocks of instructions, wherein said fetch program count is conveyed to said instruction decoder means and each said block of instructions being dispatched has a corresponding program count, said fetch program count being related to the program count of the block of instructions being dispatched, and wherein said instruction decoder means provides said functional units with said fetch program count corresponding to the block of instructions being dispatched.

78. A microprocessor as defined in claim 77 wherein said plurality of instructions of each said block of instructions are arranged in consecutive ascending order, each said instruction having a corresponding actual program count related to said program count of its block of instructions by the displacement in the number of instructions between said instruction and the first one of said block of instructions, and wherein said control means of each said functional determines said actual program count of the instructions being executed from said displacement.

79. An instruction dispatch arrangement for use in a microprocessor of the type including multiple functional units and configured for executing a plurality of instructions during each microprocessor operating cycle, said instruction dispatch arrangement comprising:
 an instruction source for providing a plurality of said instructions during each said operating cycle said plurality of instructions being arranged as a block of instructions; and
 instruction decoder means coupled to said instruction source for applying a dispatch criteria to said plurality of instructions received from said instruction source and dispatching to said functional units all said instructions satisfying said dispatch criteria, wherein said instruction source provides a next block of instructions after all of said instructions are received from said instructions are dispatched by the instruction decoder means.

80. An arrangement as defined in claim 79 wherein said instructions are provided by said instruction source in ascending order and wherein said instruction decoder means applies said dispatch criteria to said instructions in said ascending order until one of said instructions fails to satisfy said dispatch criteria.

81. An arrangement as defined in claim 80 wherein said instruction source again provides, during a next operating cycle, said one of said instruction which failed said dispatch criteria and said provided instructions to which said dispatch criteria was not applied.

82. An arrangement as defined in claim 81 wherein said instruction source provides up to a given number of said instructions during each said operating cycle and wherein said instruction source provides, during said next operating cycle, said one instruction, said provided instructions to which said dispatch criteria was not applied, and additional instructions in ascending order until the total number of provided instructions equals said given number of instructions.

83. An arrangement as defined in claim 82 further including a plurality of instruction buses coupling said instruction source to said instruction decoder means, said plurality of instruction buses being equal in number to said given number, said buses being arranged in said ascending order from a lowest order bus to a highest order bus, and wherein said one instruction is provided, during said next operating cycle, to said instruction decoder means by said instruction source over said lowest order bus.

84. An arrangement as defined in claim 83 wherein said instruction source further provides, during said next operating cycle, said instruction to which said dispatch criteria was not applied and said additional instructions over correspondingly ordered ones of said plurality of instruction buses.

85. An arrangement as defined in claim 84 wherein said instruction decoder means provides said instruction source with a dispatch status signal for each said instruction dispatched, said instruction source being responsive to said dispatch status signal for again providing said one instruction to said instruction decoder means over said least ordered bus.

86. An arrangement as defined in claim 85 wherein said instruction source accompanies, with each said instruction, a predicted executed bit either set or reset and wherein said instruction decoder is responsive to said predicted executed bits for not applying said dispatch criteria nor dispatching said instructions having an accompanying reset predicted executed bit.

87. An arrangement as defined in claim 86 wherein said instruction source includes a fetch program counter for providing a fetch program count for providing said instructions, wherein said instruction source provides said instructions in blocks of instructions, with each said block including a plurality of instructions, and wherein said instruction decoder means provides said instruction source with a hold fetch program counter control signal for cause said fetch program counter to hold a current fetch program count when said instruction decoder means is to decode instructions of the same blocks of instructions currently being decoded during a next said operating cycle.

* * * * *